(12) United States Patent
Forbes

(10) Patent No.: US 6,604,470 B1
(45) Date of Patent: Aug. 12, 2003

(54) CENTER BEAM CAR WITH DEEP UPPER BEAM STRUCTURE

(75) Inventor: James W. Forbes, Cambellville (CA)

(73) Assignee: National Steel Car Limited, Hamilton (CA)

( * ) Notice: Subject to any disclaimer, the term of this patent is extended or adjusted under 35 U.S.C. 154(b) by 0 days.

(21) Appl. No.: 09/621,304

(22) Filed: Jul. 20, 2000

Related U.S. Application Data

(63) Continuation of application No. 09/457,615, filed on Dec. 8, 1999.

(51) Int. Cl.⁷ .............................................. B61D 17/00
(52) U.S. Cl. ........................ 105/355; 105/404; 410/31
(58) Field of Search ................................. 105/355, 396, 105/404, 411, 414; 410/31, 32, 34

(56) References Cited

U.S. PATENT DOCUMENTS

| | | | |
|---|---|---|---|
| 2,839,328 A | | 6/1958 | Prickett et al. |
| 2,940,402 A | | 6/1960 | Hansen et al. |
| 2,996,020 A | | 8/1961 | Udstad |
| 3,159,112 A | | 12/1964 | Tomlinson |
| 3,244,120 A | | 4/1966 | Taylor |
| 3,675,592 A | | 7/1972 | Bateson et al. |
| 3,677,193 A | | 7/1972 | Pringle |
| 3,734,031 A | * | 5/1973 | Wagner ....................... 105/404 |
| 4,543,887 A | | 10/1985 | Baker |
| 4,681,041 A | | 7/1987 | Harris et al. |
| 4,753,175 A | | 6/1988 | Harris et al. |
| 4,784,067 A | | 11/1988 | Harris et al. |
| 4,802,420 A | * | 2/1989 | Butcher et al. ............. 105/355 |
| 4,951,575 A | | 8/1990 | Dominquez et al. |
| 4,966,081 A | * | 10/1990 | Dominguez et al. ......... 105/4.1 |
| 5,024,567 A | | 6/1991 | Dominquez et al. |
| 5,088,417 A | | 2/1992 | Richmond et al. |
| 5,626,083 A | * | 5/1997 | Saxton ........................ 105/355 |
| 5,758,584 A | * | 6/1998 | Saxton ........................ 105/355 |
| 6,199,486 B1 | | 3/2001 | Landrum et al. |

OTHER PUBLICATIONS

The Car and Locomotive Cyclopedia of American Practices, Fourth Edition, Simmons–Boardman Publishing Corporation, Omaha, Nebraska, pp. 242–243 and 256.

* cited by examiner

Primary Examiner—S. Joseph Morano
Assistant Examiner—Frantz F. Jules
(74) Attorney, Agent, or Firm—Hahn Loeser + Parks, LLP; Stephen L. Grant

(57) ABSTRACT

A center beam car has a main deck structure extending laterally from a main center sill, a laterally extending top truss structure, and a central vertically oriented web work structure for carrying vertical shear loads. The center beam so formed defines bunks upon in which to carry cargo. The upper region of the web-work structure includes a deep upper beam structure that has downwardly extending planar surfaces. The surfaces provide a bearing area against which bundled loads can be secured. The surfaces are inwardly reinforced to discourage deflection between adjacent upright members of the vertical web work.

50 Claims, 16 Drawing Sheets

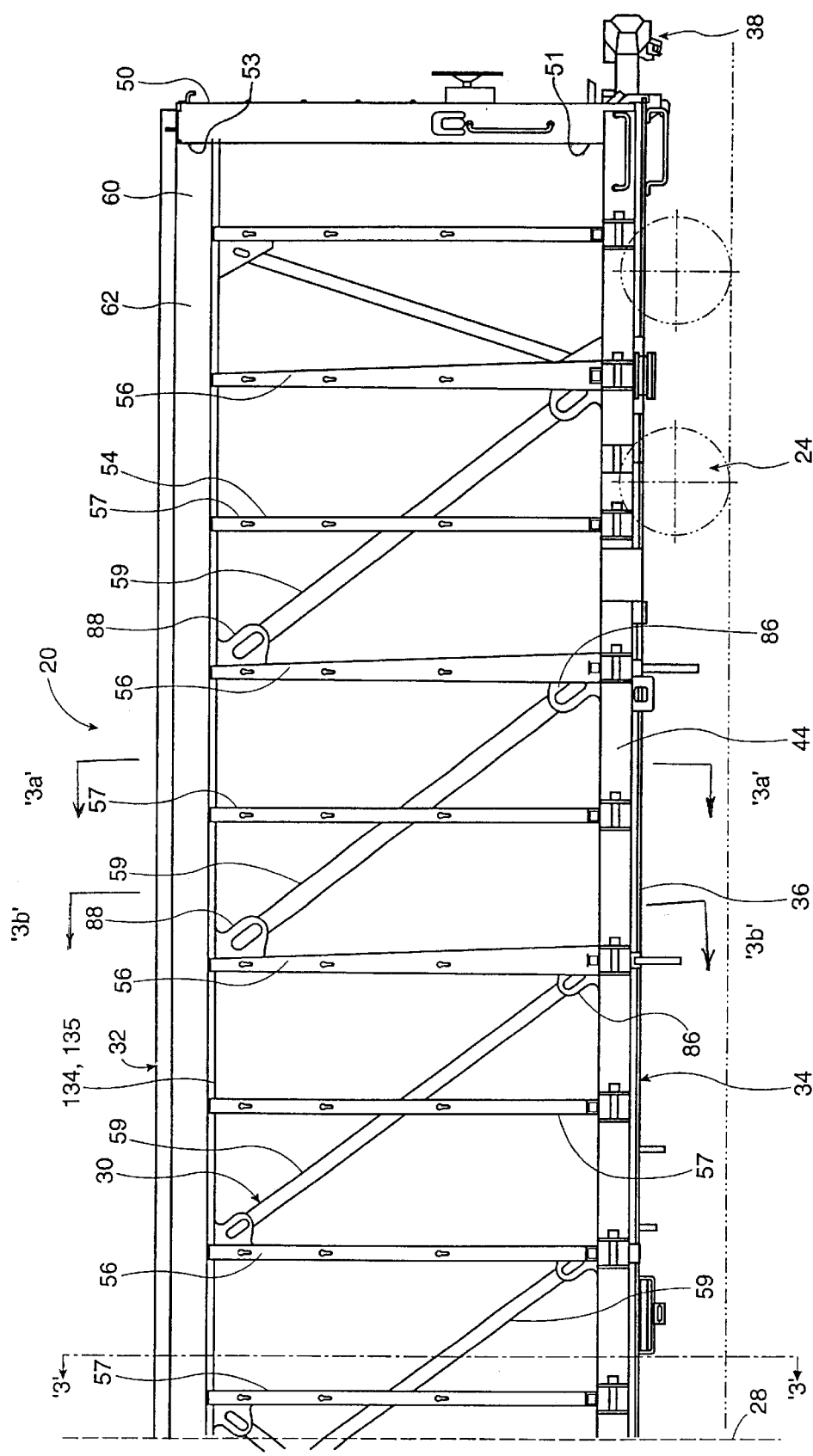

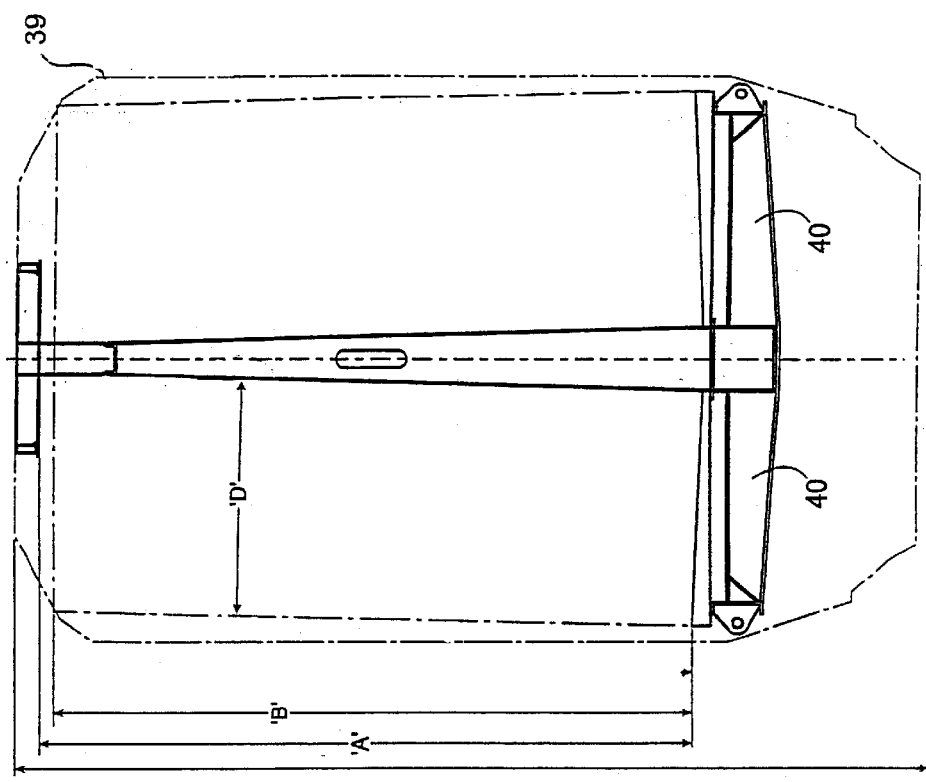
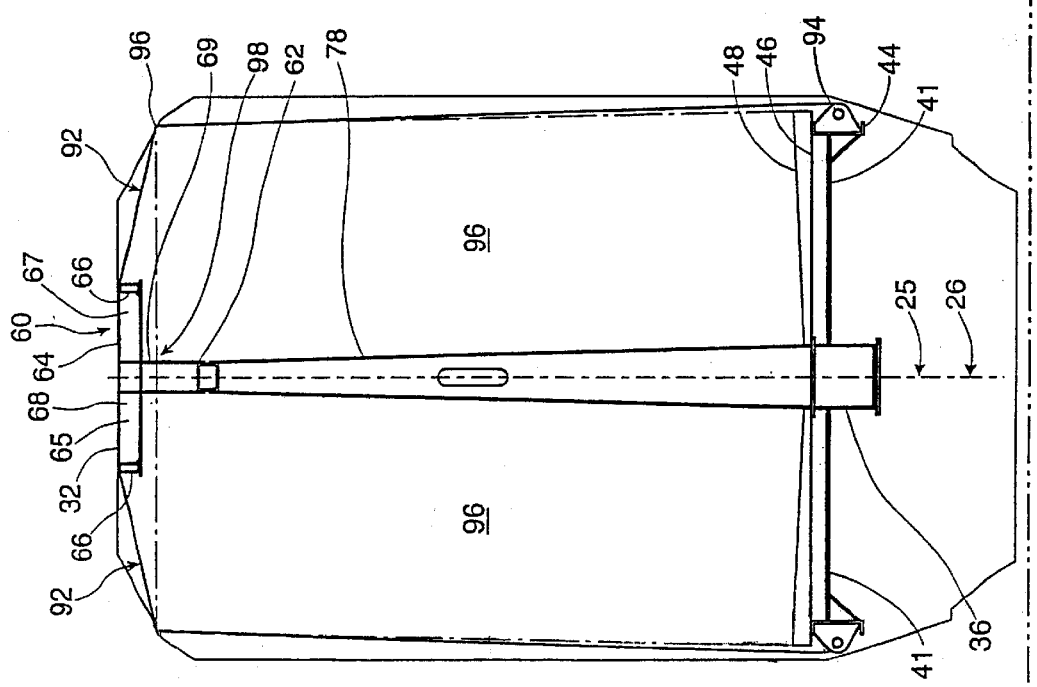
Figure 3a
Figure 3b

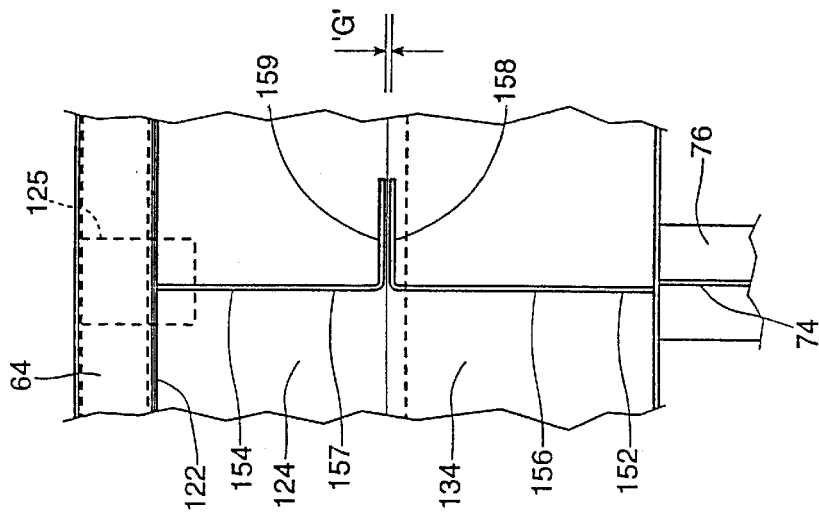
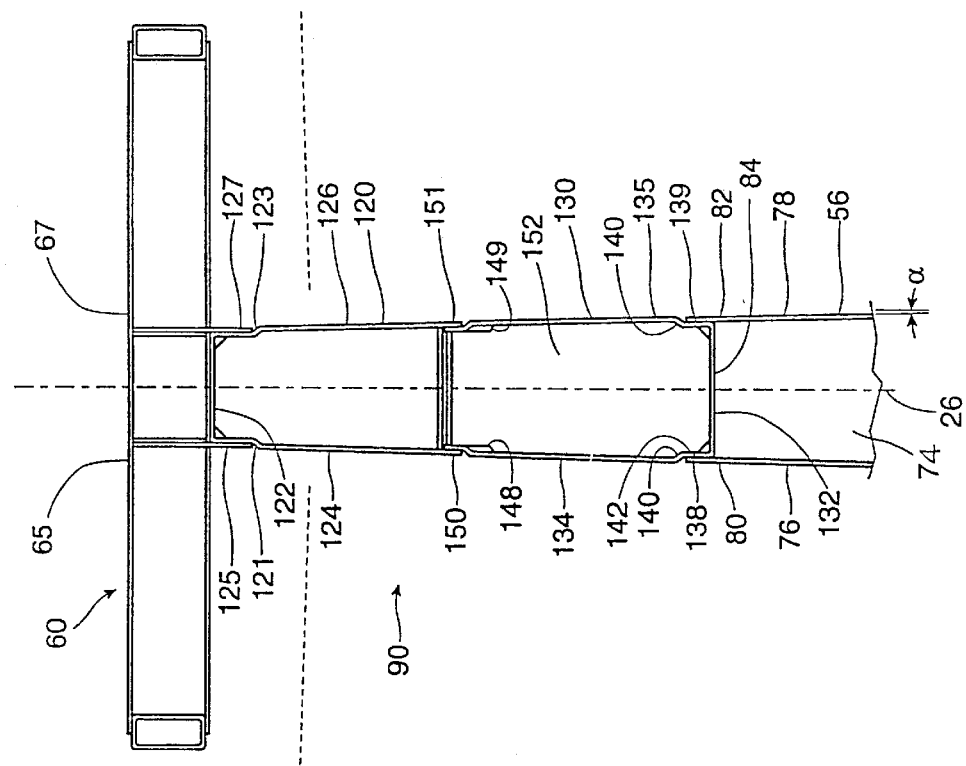
Figure 4b
Figure 4a

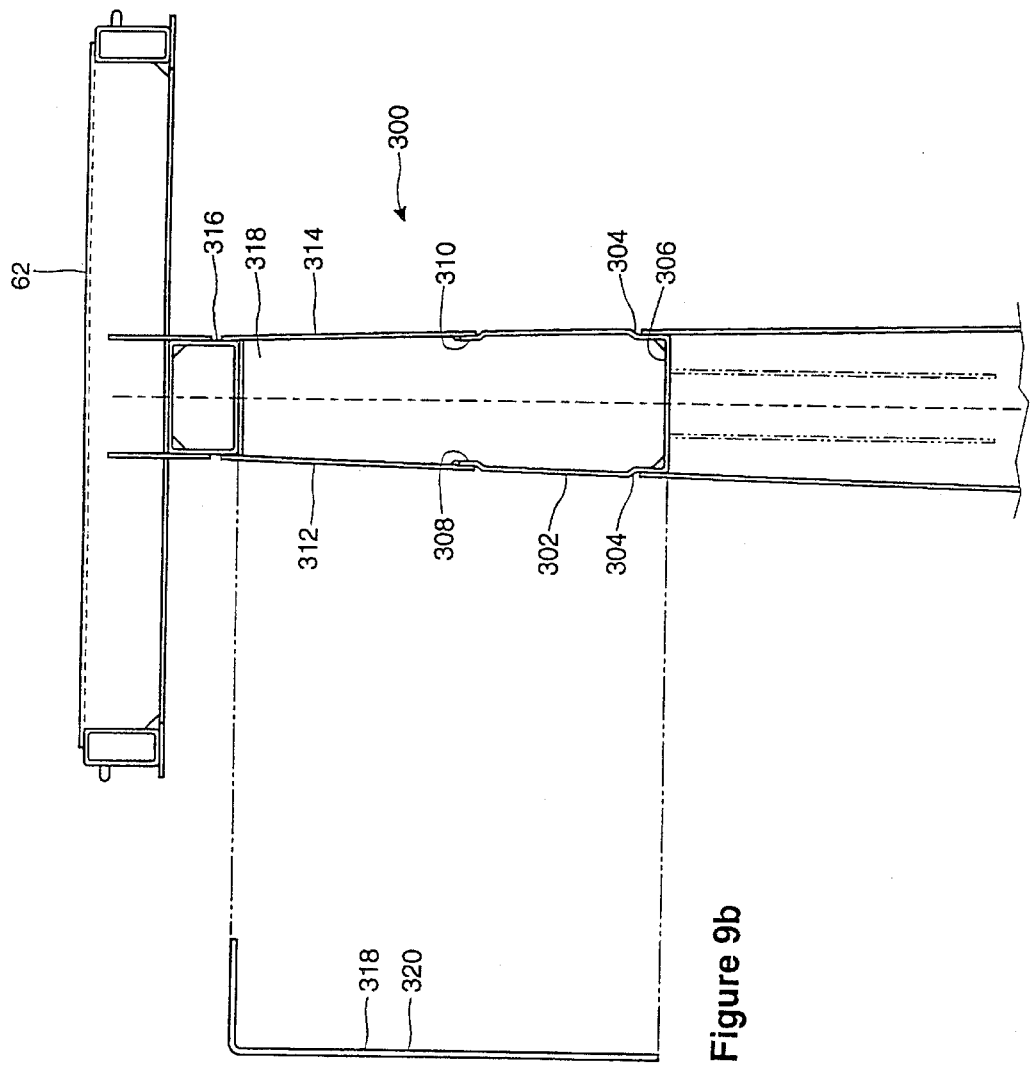

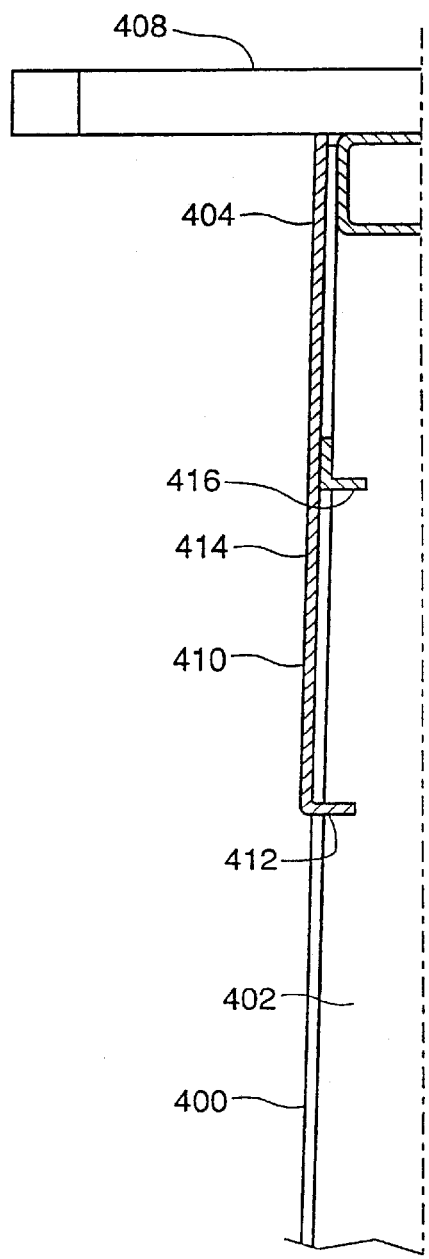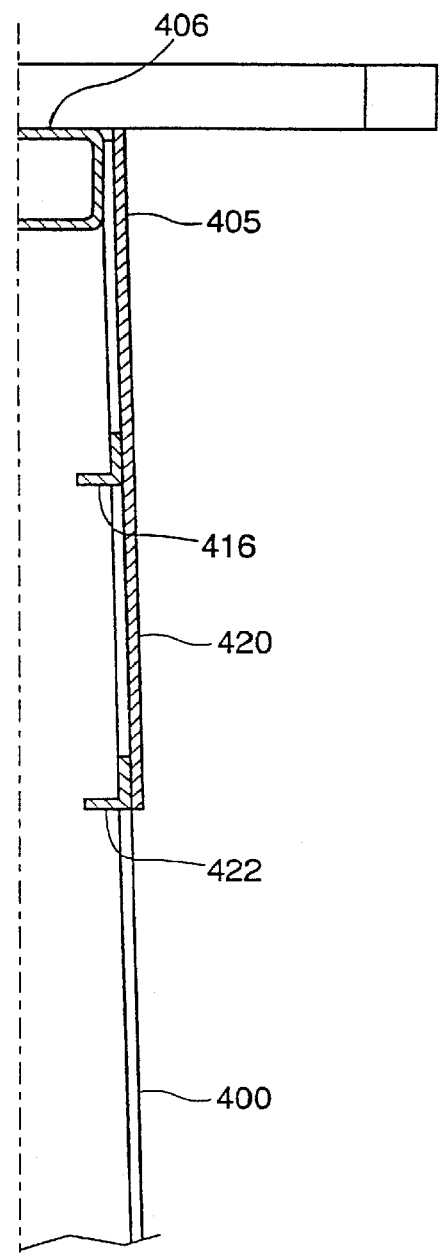
Figure 12a
Figure 12b

CENTER BEAM CAR WITH DEEP UPPER BEAM STRUCTURE

This application is a continuation of U.S. patent application Ser. No. 09/457,615 filed Dec. 8, 1999.

FIELD OF THE INVENTION

This invention relates generally to center beam rail road cars, and, in particular, to center beam cars having a deepened upper beam structure.

BACKGROUND OF THE INVENTION

Center beam railroad cars have a pair of end structures mounted on railroad car trucks. A center sill extends the length of the car between the end structures. A deck extends laterally outward from the center sill above, and between, the end structures. A pair of end bulkheads stand at the ends of the car and extend transversely of the rolling direction of the car. A center beam structure, typically in the nature of a truss, stands upright from the deck and runs along the longitudinal centerline of the car between the end bulkheads. The center beam is a deep girder beam whose bottom flange is the center sill, and whose top flange is the top truss (or analogous structure) of the car. Typically, a web work structure for carrying vertical shear loads, such as an open framework of posts and diagonal braces, extends between the center sill and the top truss. An upper beam assembly, that is, the upper or top flange end of the center beam, is usually manufactured as a wide flange, or flange-simulating truss, both to co-operate with the center sill to resist vertical bending, and also to resist bending due to horizontal loading of the car while travelling on a curve. Center beam cars are commonly used to transport packaged bundles of lumber, although other loads such as pipe, steel, engineered wood products, or other goods can also be carried.

The space above the deck on each side of the center beam forms a bunk upon which bundles of wood can be loaded. The base of the bunk has risers that are mounted to slant inward, and the center beam itself is tapered from bottom to top, such that when the bundles are stacked, the overall stack leans inward toward the longitudinal centerline of the car. The load is most typically secured in place using straps or cables. The straps extend from a winch device at deck level, upward outside the bundles, to a top fitting. The top fitting can be located at one of several intermediate heights for partially loaded cars. Most typically the cars are fully loaded and the strap terminates at a fitting mounted to the outboard portion of the upper beam assembly. In as much as the upper beam assembly is narrower than the bundles, when the strap is drawn taut by tightening the pawl, it binds on the upper outer corner of the topmost bundle and exerts a force inwardly and downwardly, tending thereby to hold the stack in place tight against the web of the center beam.

Each bundle typically contains a number of pieces of lumber, commonly 2×4, 2×6, 2×8 or other standard size. The lengths of the bundles vary, typically ranging from 8' to 24', in 2' increments. The most common bundle size is nominally 32 inches deep by 49 inches wide, although 24 inch deep bundles are also used, and 16 inch deep bundles can be used, although these latter are generally less common. A 32 inch nominal bundle may contain stacks of 21 boards, each 1½ inch thick, making 31½ inches, and may include a further 1½ inches of dunnage for a total of 33 inches. The bundles are loaded such that the longitudinal axes of the boards are parallel to the longitudinal, or rolling, axis of the car generally. The bundles are often wrapped in a plastic sheeting to provide some protection from rain and snow, and also to discourage embedment of abrasive materials such as sand, in the boards. The bundles are stacked on the car bunks with the dunnage located between the bundles such that a fork-lift can be used for loading and unloading.

It has been observed that when the straps are tightened, the innermost, uppermost boards of the topmost bundle bear the greatest portion of the lateral reaction force against the center beam due to the tension in the straps or cables. It has also been observed that when these bundles bear against the vertical posts of the center beam, the force is borne over only a small area. As the car travels it is subject to vibration and longitudinal inertia loads. Consequently the plastic sheeting may tend to be torn or damaged in the vicinity of the vertical posts, and the innermost, uppermost boards can be damaged.

The physical damage to these boards may tend to make them less readily saleable. Further, whether or not the boards are damaged, if the plastic is ripped, moisture can collect inside the sheeting. This may lead to the growth of molds, and may cause discolouration of the boards. In some markets the aesthetic appearance of the wood is critical to its saleability, and it would be advantageous to avoid this discolouration.

In part, the difficulty arises because the bearing area may be too small. Further, the join between the upstanding web portion of the center beam and the upper beam assembly can coincide with the height of the topmost boards. This join is not always smooth. Further still, when the posts are fabricated, the flanges of the posts may not stand perfectly perpendicular to the webs of the respective posts. That is, the post flanges may not be co-planar with the side webs, or legs, of the adjoining top chord, such that one edge of the flange may be twisted so that it bears harder against the bundles than another.

It is also desirable that the bundles stack squarely one upon another. Although it is possible to use wooden battens at the top end of the center beam, this will tend to cause the top bundle to sit outwardly of its neighbours. It has been observed that a thin wooden batten, of ¾" thickness may tend to bow inwardly between adjacent posts, and may not spread the wear load as much as may be desired. A 1½ inch thick wooden batten may have a greater ability to resist this bowing effect. However, the space available for employing a batten may tend to be limited by the design envelope of the car. In as much as is advantageous to load the car as fully as possible, and given that the design of the car may usually reflect a desire to maximize loading within the permissible operational envelope according to the applicable AAR standard, the use of a relatively thick wooden batten may tend to push the outside edge of the top bundle outside the permissible operational envelope. Wooden battens may also be prone to rotting if subject to excessive exposure to moisture, or may be consumable wear items that may require relatively frequent periodic replacement.

It would be desirable to have an upper beam assembly that is integrated into the structure, that is formed to spread the bearing load across a larger area, that would tend to resist the bowing phenomenon, that would tend not to require frequent replacement, and that would tend not to be prone to rotting.

SUMMARY OF THE INVENTION

In an aspect of the invention there is a center beam railroad car having a longitudinal centerline. The railroad car is supported by rail car trucks at either end thereof. The railroad car comprises a cargo support structure borne between the trucks, upon which cargo can be carried. There is a web work assembly including an array of posts mounted along the longitudinal centerline of the railroad car. The array extends upwardly of the cargo support structure, and the array is braced longitudinally. An upper beam assembly surmounts the web work assembly. The upper beam assembly has cantilevered wings extending laterally of the longitudinal centerline. The railroad car has a load limit height defined at a level measured upwardly from the cargo support structure, and has a nominal load height that is less than the load limit height. The nominal load height is at least as great as 32 inches multiplied by Q, where Q is the integer quotient obtained by dividing the load limit height by 32 inches. The web work assembly has at least one skirt member mounted thereto to define a longitudinally extending face against which loads placed laterally outward thereof can bear. The skirt member extends from a first height that is at least as high as the nominal load height to a second height that is at least six inches below the nominal load height.

In another feature of that aspect of the invention the first height is at least 2 inches above the nominal load height. In an additional feature of that aspect of the invention the first height is at least as high as the load limit height. In another additional feature of that aspect of the invention the distance between the first and second heights is at least 12 inches. In still another additional feature of that aspect of the invention the distance between the first and second heights is at least 24 inches. In yet another additional feature of that aspect of the invention the distance between the first and second heights is at least 30 inches. In a further additional feature of that aspect of the invention the skirt member extends between two posts of the array.

In a still further additional feature of that aspect of the invention each of the posts is located at a longitudinal station along the longitudinal centerline. The skirt member extends longitudinally over a range of distance that includes the longitudinal station of at least one of the posts. The skirt member has a portion that is longitudinally distant from one of the posts, and the reinforcement stiffens the longitudinally distant portion.

In yet another additional feature of that aspect of the invention the center beam car has a first skirt member and a second skirt member. The first skirt member has a first face for engaging loads placed laterally to one side of the web work assembly, and the second skirt member has a second face for engaging loads placed laterally to the other side of the web work assembly. In still another additional feature of that aspect, the reinforcement is a web extending between the first skirt member and the second skirt member.

In another aspect of the invention there is a center beam railroad car having a longitudinal centerline. The center beam car is supported by rail car trucks at either end thereof. The center beam railroad car has a center sill extending between the trucks. There is a decking structure extending laterally of the center sill upon which loads can be placed. An open truss assembly extends upwardly from the center sill. An upper beam assembly is mounted upon the open truss assembly. The upper beam structure includes laterally extending wing portions and a vertical stem portion. The stem portion is mounted to the open truss assembly at a joining interface, and the laterally extending wing portions are mounted to the stem. The stem includes a pair of longitudinally extending, laterally spaced apart, first and second skirt members. The first skirt member has a first outwardly facing surface against which cargo placed laterally outboard thereof can bear. The second skirt member has a second outwardly facing surface against which cargo placed laterally outboard thereof can bear. The center beam car has an upper load limit height defined at a level between the decking structure and the laterally extending wings. The first and second skirt members are located to overlap the load limit height. The outside lateral dimension of the stem matches the overall outside dimension of the open truss assembly at the joining interface.

In an additional feature of that aspect of the invention the stem and the open truss assembly have slope continuity at the joining interface. In still another additional feature of that aspect of the invention the open truss assembly has a taper from bottom to top and the first and second skirt members are angled to match the taper of the truss assembly. In still yet another additional feature of that aspect of the invention the car conforms to AAR plate C, and 49 inches is at least as great as the distance from the first outwardly facing surface of the first skirt member to the limit of the AAR plate 'C' profile, measured along the load limit height boundary. In a further additional feature of that aspect of the invention the open truss assembly includes an array of upright posts spaced along the longitudinal centerline and bracing. The posts have notched upper ends; and the stem includes a longitudinally extending top chord member formed to seat in the notched upper ends of the posts. In still a further additional feature of that aspect of the invention the top chord member includes a U-shaped pressing. The first and second skirt members are formed integrally therewith. In still yet a further additional feature of that aspect of the invention the U-shaped pressing has a back and the first and second skirt members have an inwardly stepped shoulder extending there along for seating in the notches of the posts.

In an additional feature of that aspect of the invention the longitudinally extending top chord member is a channel having a back and legs. The back is of a width to seat in the notches of the posts, and the first and second skirt members are mounted to the legs. In another additional feature of that aspect of the invention the longitudinally extending top chord member is a tube. The first and second skirt members are mounted to sides of the tube to leave a portion of the tube extending downwardly beyond the first and second skirt members. The notches of the posts are formed to engage the downwardly extending portion of the tube.

In still another additional feature of that aspect of the invention the open truss assembly includes a plurality of upright posts spaced along the longitudinal centerline of the railroad car and diagonal bracing mounted thereto. Each of the posts has a width transverse to the longitudinal centerline of the railroad car. The posts taper from a wider portion adjacent to the decking structure to a narrower portion at a top end adjacent to the upper beam assembly. Each of the posts has a notch defined in the top end thereof. The stem is a top chord assembly having a first U-shaped formed member seated in the notch. The first U-shaped member has a back and upstanding legs. A second U-shaped, formed member has a back and downwardly extending legs. The legs of the first and second U-shaped members co-operate to define the skirt members. The legs of the first and second U-shaped members are formed at an angle matching the taper of the tapered posts.

In another aspect of the invention there is a center beam rail car having a longitudinal centerline. The center beam rail car is supported by rail car trucks at either end thereof. The center beam railroad car has a center sill extending between the trucks, a decking structure extending laterally of the center sill upon which loads can be placed, an open truss structure extending upwardly from the center sill and an upper beam assembly mounted upon the open truss structure. The upper beam structure includes laterally extending wing portions. The open truss structure has a pair of longitudinally extending, laterally spaced apart, first and second skirt members mounted thereto. The first and second skirt members each have an outwardly facing surface against which cargo placed laterally outboard thereof can bear. The center beam car has an upper load limit height defined at a level between the decking structure and the laterally extending wings. The first and second skirt members are located to overlap the load limit height. The first and second skirt members have at least one reinforcement mounted laterally inboard thereof to discourage lateral deflection of the faces when cargo placed laterally outward thereof bears against the first and second skirt members.

In a further aspect of the invention, there is a rail road car having a longitudinal centerline. It comprises a pair of rail car trucks and a center beam assembly carried thereupon. The center beam assembly has a lower flange assembly, an upper flange assembly, and a web assembly extending between the upper and lower flange assemblies. The web assembly has a plurality of upwardly extending posts. The posts have a lower region and an upper region. The web assembly has a non-consumable skirt mounted to the upper region of the posts. The skirt presents a bearing surface. The bearing surface faces laterally outward relative to the longitudinal centerline of said rail road car. Cargo can bear against the bearing surface.

In an additional feature of that aspect, the posts have a laterally outwardly facing flange, and the laterally outwardly facing skirt is mounted flush with the flange. In another alternative additional feature of that aspect of the invention, the posts have a laterally outwardly facing flange, and the skirt stands proud of said outwardly facing flange a distance less than ¾ inches. In still another additional feature of that aspect of the invention, the skirt is formed of a hollow cell material having an outwardly facing skin. In another alternative additional feature, the skirt is formed of a corrugated section with an outer skin against which objects may bear. In a further additional feature of that aspect of the invention, the skirt is laterally inwardly reinforced to discourage bowing thereof between adjacent pairs of posts.

In another aspect of the invention there is a center beam rail road car having a longitudinal centerline, the rail road car being supported by rail car trucks at either end thereof The railroad car has a cargo support structure borne between the trucks, upon which cargo can be carried. The cargo support structure includes decking having a first end, a second end, and upstanding bulkheads mounted at each of the first and second ends. Each of the bulkheads has a base adjoining the decking and an upper end upwardly distant therefrom. A web work assembly including an array of posts is mounted along the longitudinal centerline of the railroad car, the array extending upwardly of the cargo support structure. The web work assembly has a lower region adjacent to the cargo support structure, and an upper region distant from the cargo support structure. An upper beam is located above the web work assembly. The upper beam runs between the upper ends of the bulkheads. The upper beam member has at least one structural member mounted to the upper region of the web work, the structural member having a longitudinally extending face against which lading placed laterally outward of the posts can bear. A reinforcement member extends laterally inward of the face to discourage lateral deflection of the longitudinally extending face.

In still another aspect of the invention there is a center beam railroad car having a longitudinal centerline. The center beam railroad car is supported by rail car trucks at either end thereof. The center beam railroad car has a center sill extending between the trucks; a decking structure extending laterally of the center sill, upon which loads can be placed; an open web work structure extending upwardly from the center sill; and an upper beam mounted upon the open web work structure. The upper beam is mounted to the open web work structure at a joining interface. The upper beam has a pair of longitudinally extending, laterally spaced apart, planar members, the planar members each having a smooth outwardly facing surface against which cargo placed laterally outboard thereof can bear. The upper beam planar members have an outside lateral dimension matching the open web work structure at the joining interface.

In a further aspect of the invention, there is a center beam car having a longitudinal centerline, the center beam car being supported by rail car trucks at either end thereof. The center beam rail car includes a center sill extending between the trucks; a decking structure extending laterally of the center sill upon which loads can be placed; and an open truss structure extending upwardly from the center sill. The open truss structure includes an upper beam assembly mounted upwardly of, and parallel to, the center sill. The open truss structure includes an array of posts extending between the center sill and the upper beam assembly. The upper beam assembly has a pair of longitudinally extending, laterally spaced apart, planar members. The planar members each have an outwardly facing surface against which cargo placed laterally outboard thereof can bear. The outwardly facing surfaces stand proud of the posts. The planar members each have a longitudinally extending reinforcement mounted laterally inboard thereof to discourage lateral deflection of the faces when cargo placed laterally outward thereof bears there against.

In still another aspect of the invention, there is a railroad car having a longitudinal centerline. The railroad car has a pair of rail car trucks and a center beam assembly carried thereupon. The center beam assembly has a center sill; a cargo support structure extending laterally of the center sill assembly; and a plurality of posts extending upwardly from the center sill. The cargo support structure includes decking having a first end, a second end, and upstanding bulkheads mounted at each of the first and second ends. Each of the bulkheads has a base adjoining the decking and an upper end upwardly distant therefrom. The posts have a lower region adjacent the center sill and an upper region distant from the center sill. A non-consumable, longitudinally extending upper beam assembly is mounted to the upper region of the posts and runs between the upper ends of the bulkheads. The upper beam assembly includes a longitudinally extending structural member presenting a bearing surface facing laterally outward, against which cargo can bear, the bearing surface being reinforced to discourage lateral deflection thereof.

BRIEF DESCRIPTION OF THE DRAWINGS

FIG. 2 shows a side view of one half of the center beam car of FIG. 1;

FIG. 3a shows a cross-section of the car of FIG. 2 taken on section '3a—3a';

FIG. 3b shows a cross-section of the car of FIG. 2 taken on section '3b—3b';

FIG. 4a shows a detail of the section of FIG. 3;

FIG. 4b shows a side sectional view of the detail of FIG. 4a;

FIG. 5a shows a alternate detail to that of FIG. 4a;

FIG. 5b shows a side sectional view of the detail of FIG. 5a;

FIG. 6a alternate detail to that of FIG. 4a;

FIG. 6h shows a side sectional view of the detail of FIG. 6a;

FIG. 7a shows an alternate detail to that of FIG. 4a;

FIG. 7b shows a side sectional view of the detail of FIG. 7a;

FIG. 8a shows an alternate detail to that of FIG. 4a;

FIG. 8b shows a side sectional view of the detail of FIG. 8a;

FIG. 9a shows an alternate detail to that of FIG. 4a;

FIG. 9b shows a side sectional view of the detail of FIG. 9a;

FIG. 10 shows an alternate detail to that of FIG. 4a;

FIG. 11 shows an alternate detail to that of FIG. 4a;

FIG. 12a shows an alternate detail to that of FIG. 4a;

FIG. 12b shows an alternate detail to that of FIG. 12a;

FIG. 12c shows an alternate detail to that of FIG. 12a;

FIG. 12b shows an alternate detail to that of FIG. 12c;

FIG. 13 shows an alternate detail to that of FIG. 4a;

FIG. 14 shows an alternate detail to that of FIG. 4a;

FIG. 15 shows an alternate detail to that of FIG. 4a; and

FIG. 16 shows an alternate detail to that of FIG. 4a.

DETAILED DESCRIPTION OF THE PREFERRED EMBODIMENT

Figure 1:
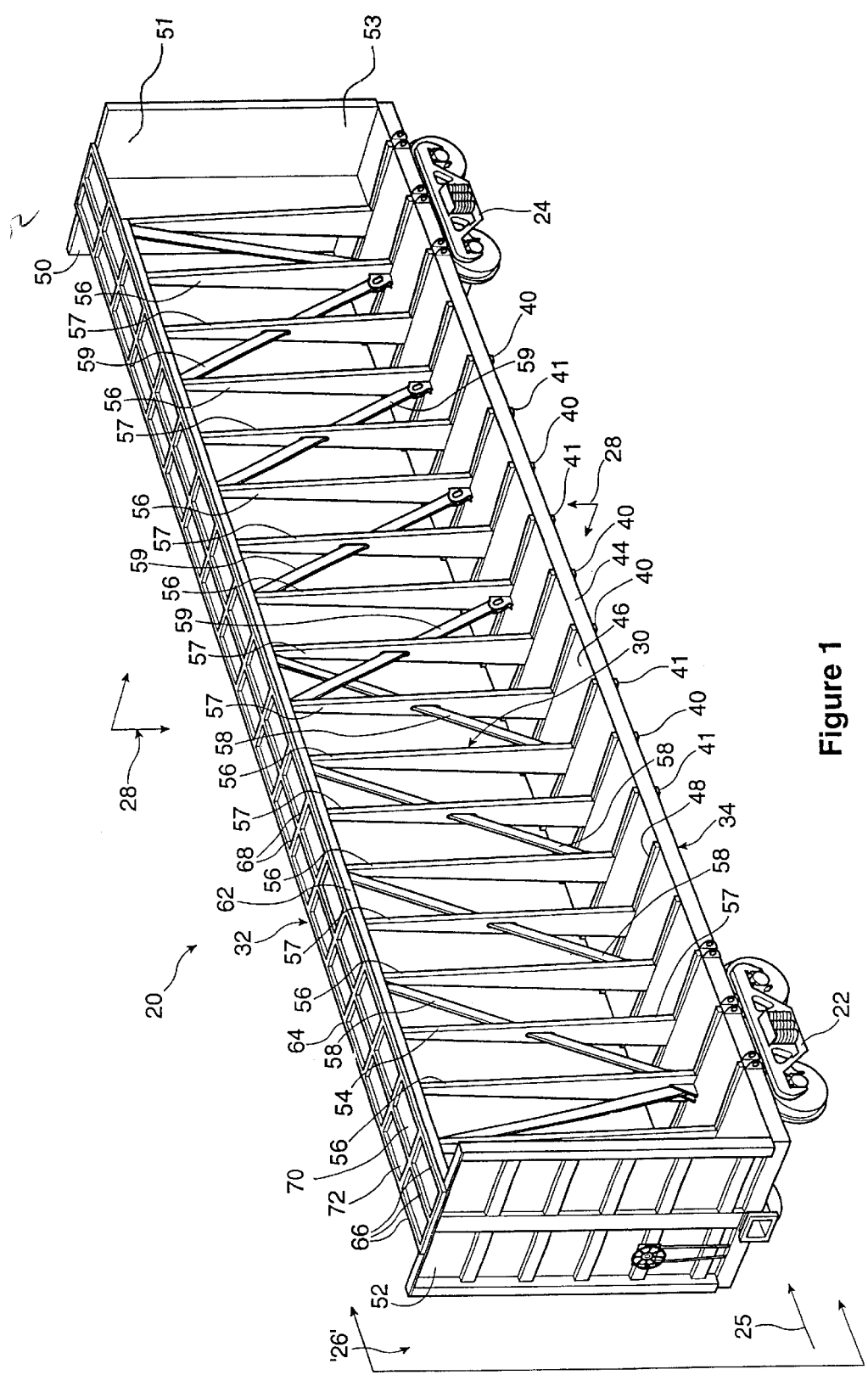
FIG. 1 shows an isometric, general arrangement view of a center beam car according to the present invention.

The description which follows, and the embodiments described therein, are provided by way of illustration of an example, or examples of particular embodiments of the principles of the present invention. These examples are provided for the purposes of explanation, and not of limitation, of those principles and of the invention. In the description which follows, like parts are marked throughout the specification and the drawings with the same respective reference numerals. The drawings are not necessarily to scale and in some instances proportions may have been exaggerated in order more clearly to depict certain features of the invention.

A center beam railroad car is indicated in FIG. 1 generally as 20. It is carried on railroad car trucks 22 and 24 in a rolling direction along rails in the generally understood manner of railcars. Car 20 has a longitudinal centerline 25 lying in a longitudinal plane of symmetry, indicated generally as 26 which intersects the kingpin connections of trucks 22 and 24. It will be appreciated that aside from fittings such as hand grabs, ladders, brake fittings, and couplers, the structure of car 20 is symmetrical about the longitudinal plane of symmetry, and also about a transverse plane of symmetry 28 at the mid-length station of the car. In that light, a structural description of one half of the car will serve to describe the other half as well.

The structure of a center beam car is analogous to a deep beam having a tall central structure to approximate the web of a beam, or a web-like structure or truss assembly, a wide flange at the bottom, and a wide flange at the top. In the case of railroad car 20, the central web-work assembly is indicated generally as 30 and runs in the longitudinal direction (that is, the rolling direction of the car), the top flange function is served by a top truss assembly 32, and the lower flange function is performed by a lower flange assembly in the nature of a lateral support structure 34, upon which cargo can be placed, and that extends laterally outward to either side of a main center sill 36.

In detail, as shown in FIGS. 2, 3a and 3b, car 20 has at its lowest extremity main center sill 36, in the nature of a fabricated steel box beam that extends longitudinally along the centerline of car 20 throughout its length, having couplers 38 mounted at either end. Cross bearers 40 extend outwardly from center sill 36 to terminate at a pair of longitudinal left and right hand side sills 42, 44 that also run the length of the car. In the car illustrated, alternating cross-bearers 40 and crossties 41 extend laterally outward from center sill 36 on approximately 4 ft centers. Decking 46 is mounted to extend between cross-bearers 40, and crossties 41 providing a shear connection between adjacent cross-bearers when side loads are imposed on the car. Tapered risers 48 are mounted above the cross-bearers to form the base of a bunk for carrying loads. Risers 48 are tapered so that loads stacked thereupon will tend to lean inwardly toward the centerline of car 20. The combined structure of center sill 36, cross-bearers 40, and side sills 42, 44 and decking 46 provides a wide, lower beam or lower flange assembly extending laterally outward from the longitudinal centerline of car 20.

At either end of car 20 there are vertically upstanding fore and aft end bulkheads 50 and 52 which extend from side to side, perpendicular to the central longitudinal plane 26 of car 20. Each of bulkheads 50 and 52 has a base portion 53 adjoining decking 46, and an upper end 51 located upwardly away from decking 46. Running the full length of car 20 between end bulkheads 50 and 52 is an array 54 of upright posts 56, 57. Array 54 is reinforced by diagonal braces 58, 59, that provide a sheer path for vertical loads.

As also shown in FIGS. 3a and 3b, the array 54 of posts 56 (and 57) is surmounted by an upper beam assembly 60 that runs between the upper ends 51 of bulkheads 50 and 52. A deep beam top chord assembly is identified as 62. An open framework top truss 64 is mounted above, and connected to deep beam top chord assembly 62. Truss 64 has lateral wings 65 and 67 that are mounted to extend outboard from the central plane 26 of car 20 in a cantilevered manner. Truss 64 has longitudinal stringers 66, cross members 68, and web members 70 and 72.

Each of posts 56 has a central web 74 that lies in a vertical plane perpendicular to the plane 26 of car 20. Web 74 is tapered from a wide bottom adjacent main center sill 36 to a narrow top. The wide bottom portion is about 13½ inches wide, and at the top portion the inward taper is such as to yield a 6 inch width of section at the junction of top chord assembly 62 and top truss 64. At the outboard extremities of web 74 there are left and right hand flanges 76 and 78 that each lie in a longitudinal plane inclined at an angle α defined (from the vertical) by the slope of the taper of web 74. In the preferred embodiment, α is roughly 1.450°. At the top of each post 56, 57 web 74 has been trimmed back to a pair of tabs 80, 82 at the ends of flanges 76, 78. This yields a seat, socket, relief, or rebate in the nature of a generally U-shaped notch or slot 84 into which top chord assembly 62 can seat.

A horizontal cross-section of post 56 will generally have an H-shape, with web 74 lying centrally relative to flanges 76 and 78. Post 57, by contrast, although tapered in a similar manner to post 56, has a horizontal cross-section of a U-shaped channel, with its web being the back of the U, and the flanges being a pair of legs extending away from the back. Each diagonal member 58 (or 59) has a first end rooted at a lower lug 86 welded at the juncture of the base of one of the posts 56 and decking 46 and main center sill 36, and a second diagonal end rooted in an upper lug 88 at the juncture of another adjacent post 56 and top chord assembly 62. Midway along its length, diagonal beam 58 (or 59) passes through a post 57 intermediate the posts 56 to which diagonal 58 (or 59) is mounted. It is intended that the respective flanges of the various posts 56 and 57 lie in the same planes on either side of the central plane 26 of car 20 to present an aligned set of bearing surfaces against which lading can be placed.

The incline of flanges 76 and 78 is such that they lie at roughly a right angle to the inward taper of risers 48 so that generally square or rectangular bundles can be stacked neatly in the clearance openings of the bunk defined between the underside of the top truss 64 and risers 48.

In the preferred embodiment of FIGS. 2, 3a, 3b, 4a and 4b, upper beam assembly 60 can be defined as the combination of top chord assembly 62 and top truss 64. It has a cross section in the shape, generally, of a 'T', with the cross-bar of the T being defined by wings 65 and 67 of top truss 64, and the stem 69 of the 'T' being defined by top chord assembly 62, described more fully below.

Straps 92 are provided to attach to the out board, distal extremities of wings 65 and 67 of top truss 64, to be wrapped outboard of the load, and to be tightened by a come-along, a winch, a pawl-and-ratchet type of mechanism, indicated generally as 94, or similar tightening device mounted to the respective side sill 42 or 44. An operator turns mechanism 94 with the aid of an extension bar or handle (not shown). When tightened, straps 92 bear against the outboard, upper corners of bundles indicated as 96, tending to force their inboard, upper regions, indicated generally as 98, most tightly against the upright car structure that extends along plane of symmetry 26, namely array 54 and the outer shank, or skirt of stem 69 of upper beam assembly 60.

The preferred embodiment illustrated in FIGS. 2, 3a, 3b, 4a and 4b has an inside loading clearance indicated as 'A' of 137 3/16 inches perpendicular to rungs 48. It also has a loading limit indicated as 'B' extending perpendicular to the slope of web 74, at a height 132½ inches above, and measured perpendicular to, risers 48. The nominal load height is then 132 inches for 4 bundles at 33 inches each, including dunnage. The nominal load height, in general, for 31½ inch bundles of kiln dried lumber is thus the largest integer multiple of 33 inches that is less than the load limit height. In the illustrations of FIGS. 2, 3a, 3b, 4a and 4b, this loading limit permits 49 inch wide bundles to fall within the loading envelope 39 defined by AAR plate 'C' as shown by dimension 'D' in FIG. 3b. Dimension 'D' also permits a load 131 inches high and 51 inches wide to fall within the desired loading envelope 39 of AAR plate C.

Deep beam section 90 is shown in cross-section in FIG. 4a. It includes a first, or upper formed section 120 in the shape of an inverted U, having a back 122 and left and right hand legs 124, 126. Legs 124, 126 are splayed outwardly relative to the vertical at angle a to match the angle of the taper of the flanges of posts 56 and 57. Upper-formed section 120 also has inwardly stepped shoulders 121 and 123 to accommodate the mating ears of gusset plates 125 and 127 which join top truss 64 to top chord assembly 62. Deep beam section 90 also includes a second formed section 130 that is generally U-shaped, having a back 132, and a pair of left and right hand legs 134 and 135. Legs 134 and 135 each have a proximal region 138, 139 relative to back 132 that is stepped inwardly to form a shoulder 140 and a neck 142 of a size to nest between tabs 80, 82 of post 56 (or 57). Tabs 80, 82 are formed by trimming back web 74 locally to conform to the depth of shoulder 140. Legs 134, 135 also each have an inwardly stepped toe 148, 149 stepped inward a distance equal to the wall thickness of legs 134, 135 such that toes 150, 151 of legs 124, 126 of member 120 can overlap, and seat outside of, outside toes 148, 149 respectively, and be fillet welded in place. Legs 134 and 135 are angled inward to yield slope continuity with both legs 124 and 126 and also with flanges 76 and 78 of post 56 (or the corresponding flanges of post 57 as the case may be). That is, legs 134 and 135 are toed inward at the same. angle from the vertical at which legs 124, 126 are splayed outward such that the exterior surfaces are flush with, and lying in the planes of, the respective flanges of posts 56 and 57. The exterior surfaces so defined can be termed skirts.

Gussets 152 and 154 are welded inside formed section 120 and 130 respectively at longitudinal stations along the length of car 20 corresponding to the various longitudinal stations of the webs of posts 56 and 57 respectively, thus providing a substantially continuous web from main sill 36 to top truss 64. There is, however, a web discontinuity between gusset 152 and gusset 154 indicated by gap 'G', seen in FIG. 4b. In light of this discontinuity, gussets 152 and 154 have a main web leg 156, 157 that, when installed, lies in the vertical plane of web 74 and a toe 158, 159 extending at a right angle therefrom, lying in a horizontal plane. The lateral edges of toes 158 and 159 are welded along the inside faces of toes 148, 149 and 150, 151 respectively and extend a distance comparable to the width between the respective toes at that point. In the preferred embodiment the overall height of top chord assembly 64 is 27 inches, with ¼ inch wall thickness on legs 156, 157, 134 and 135. In the preferred embodiment the length of legs 134, 135 is 13.5 inches, and the overall length of legs 156, 157 is 14.5 inches. Nominally, shoulder 140 overlaps tabs 80 and 82 by 2 inches. That is, tabs 80, 82 extend 2 inches beyond web 74. Toes 158 and 159 are both 6 inches long, and the nominal width of gap 'G' is about 6.75 inches.

In this way, when assembled, legs 134, 135 and 156, 157 form respective left and right hand outwardly facing bearing surfaces against which a load may bear, and over which a reaction force to tension in the tightening straps can be spread. In the span between the stations of adjacent posts 56 and 57, the skirts, or bearing surfaces, formed in this way are reinforced by the laterally inward web, (that is, back 132) which connects both skirts (that is, legs 124 and 134, and legs 126 and 135). The laterally inward reinforcement need not be immediately behind the respective skirt or facing, but rather can be offset, as illustrated in FIG. 4a, with the influence of the web stiffening the face some distance away. The web is "inward" of the skirts in the sense of lying behind, or shy of, the profile of the contact interface with the wood bundles, since the reinforcement lies toward the centerline of the rail car, rather than proud of, the respective skirt faces. In this way an inwardly disposed stiffener will not protrude and rub against an object bearing against the outwardly facing surface of the respective skirt.

Figures 5A, 5B:
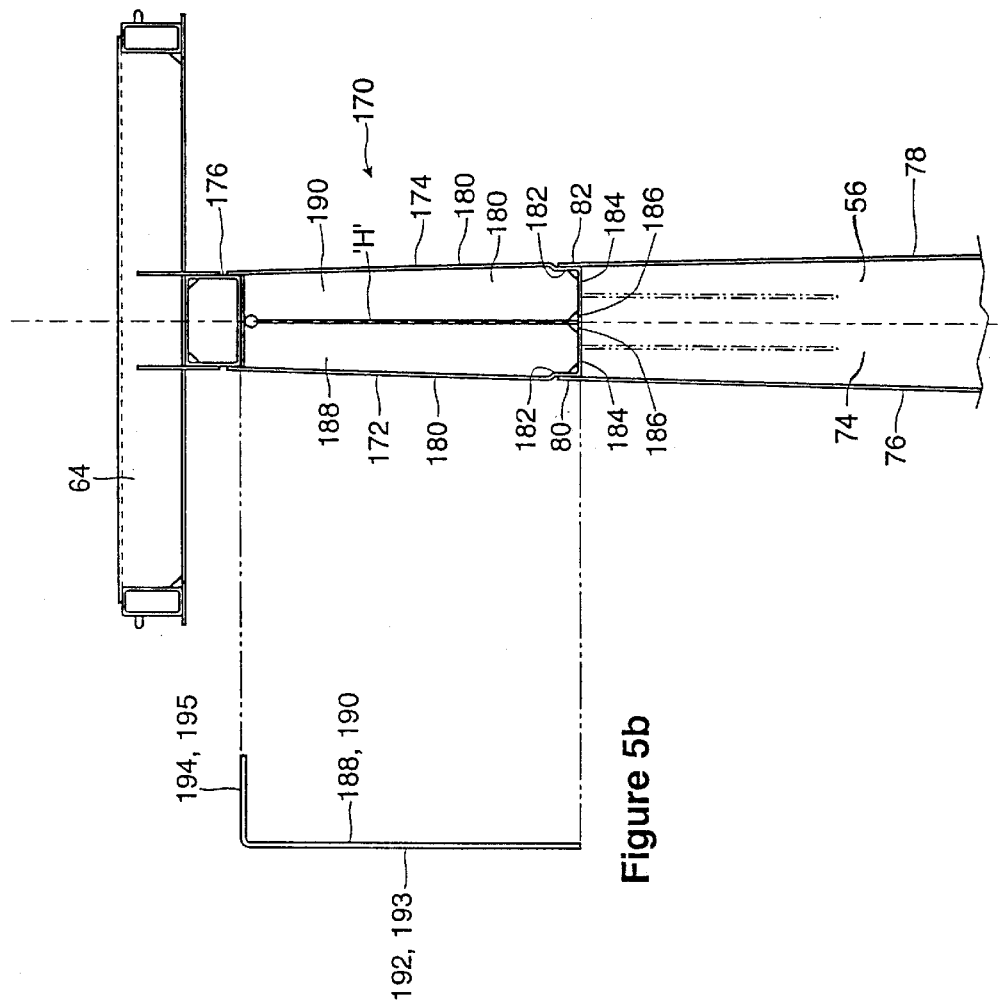

In an alternative embodiment shown in FIGS. 5a and 5b a deep beam section 170 has left and right hand formed sections 172, 174 surmounted by a rectangular tube 176, upon which top truss 64 is mounted. Each of sections 172, 174 has a main sheet 180, an inwardly stepped shoulder 182, an inwardly extending leg 184 and an upturned toe 186. In place of gussets 152 and 154, section 170 has gussets 188, 190 having a main, vertical leg 192, 193 and a horizontal leg 194, 195. Vertical legs 192, 193 are contoured to match the inside wall shape of formed sections 172, 174 respectively, and are located at longitudinal stations to correspond to the longitudinal stations of the webs of posts 56, 57, as above. Vertical legs 192, 193 are separated by a vertically extending gap having a width 'H'. Once gussets 188, 190 are welded in place, formed sections 172, 174 are welded along the seam where legs 184 of sections 172, 174 abut along the centerline of car 20. As above, the step in sections 172, 174 is of a size to seat between tabs 80, 82 of posts 56 (or 57), and the distal tips of main sheets 180 are fillet welded to the side faces of tube 176. As above, there is slope continuity between main sheets 180 and the corresponding flanges 76, 78 of posts 56, 57.

Figure 6B:
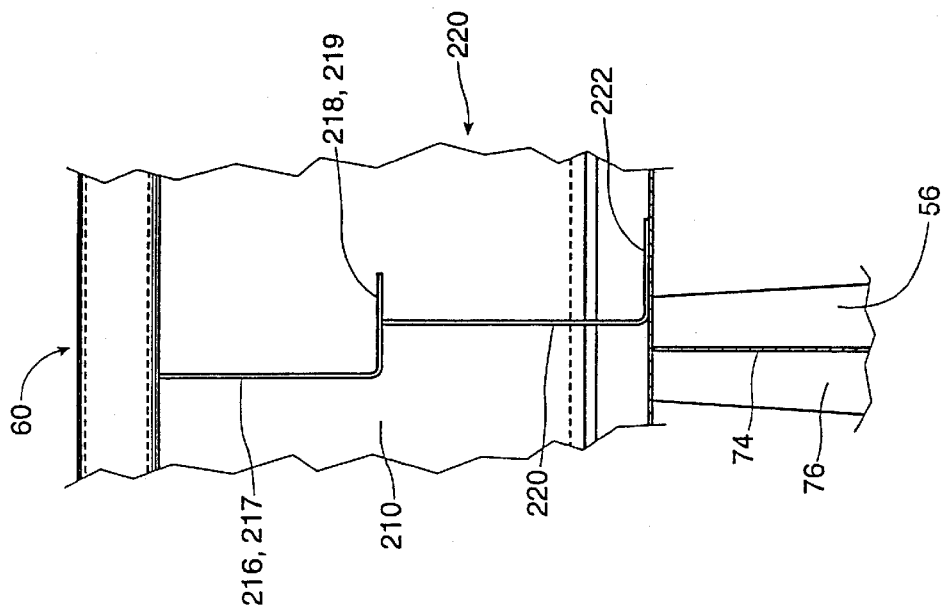
Figure 6A:
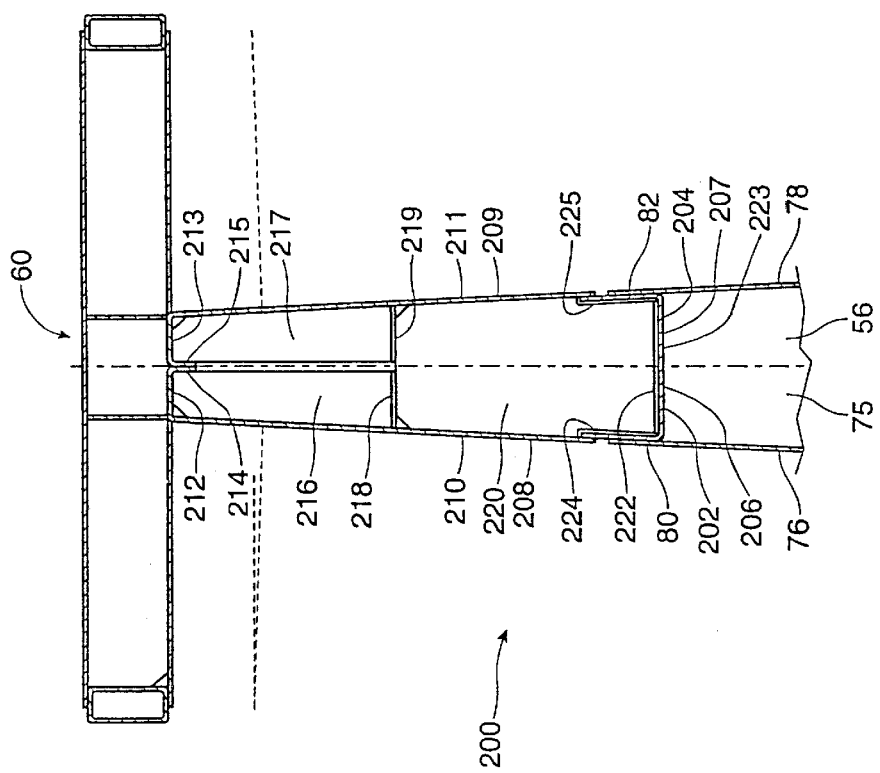

In the alternative embodiment of FIGS. 6a and 6b, a deep upper beam assembly 200 has a pair of angle irons 202 and 204 welded longitudinally inside tabs 80 and 82 of posts 56 and 57. Angle irons 202 and 204 each have an inwardly extending toe 206, 207 which bottoms on the cut edge of web 74, and an upwardly extending leg bent to conform to the slope of flanges 76 and 78 of posts 56 and 57. Beam 200 also has a pair of left and right formed sections 208, 209 each having a main sheet portion 210, 211, an inwardly extending leg 212, 213 and a re-entrant toe 214, 215.

On assembly, L-shaped gussets 216, 217 are welded in each of sections 208, 209. Gussets 216 and 217 each have a profile to match the inside profile of the upper regions of main sheet portions 210, 211, legs 212, 213 and toe 214, 215. The toes of gussets 216 and 217 are welded along their outboard edges to the inside face of main sheet portions 210, 211. Sections 208 and 209 are welded along the centerline seam between abutting toes 214 and 215. A further, main, gusset 220 is trimmed to a shape to permit welding of its top edge to the underside of the toes 218, 219 of gussets 216, 217, its side edges to the inner face of the lower regions of main sheet portions 210 and 211; once welded in this manner, the base leg 222 of gusset 220 can be welded to toes 206 and 207 of angle irons 202 and 204, with a plug weld 223 formed to fill the longitudinal gap therebetween. Gusset 220 is also trimmed to have reliefs 224, 225 to permit entry between the upwardly extending legs of angle irons 202, 204. Gussets 216, 217 and 220 are located at longitudinal stations that correspond generally to the longitudinal stations of posts 56 and 57 as the case may be. Legs 212, 213 of sections 208, 209 form, ideally, a flat surface to weld to top truss assembly 62, as before. Similarly, when installed, main sheet portions 210, 211 have slope continuity with flanges 76 and 78 of posts 56 and 57.

Figures 7A, 7B:
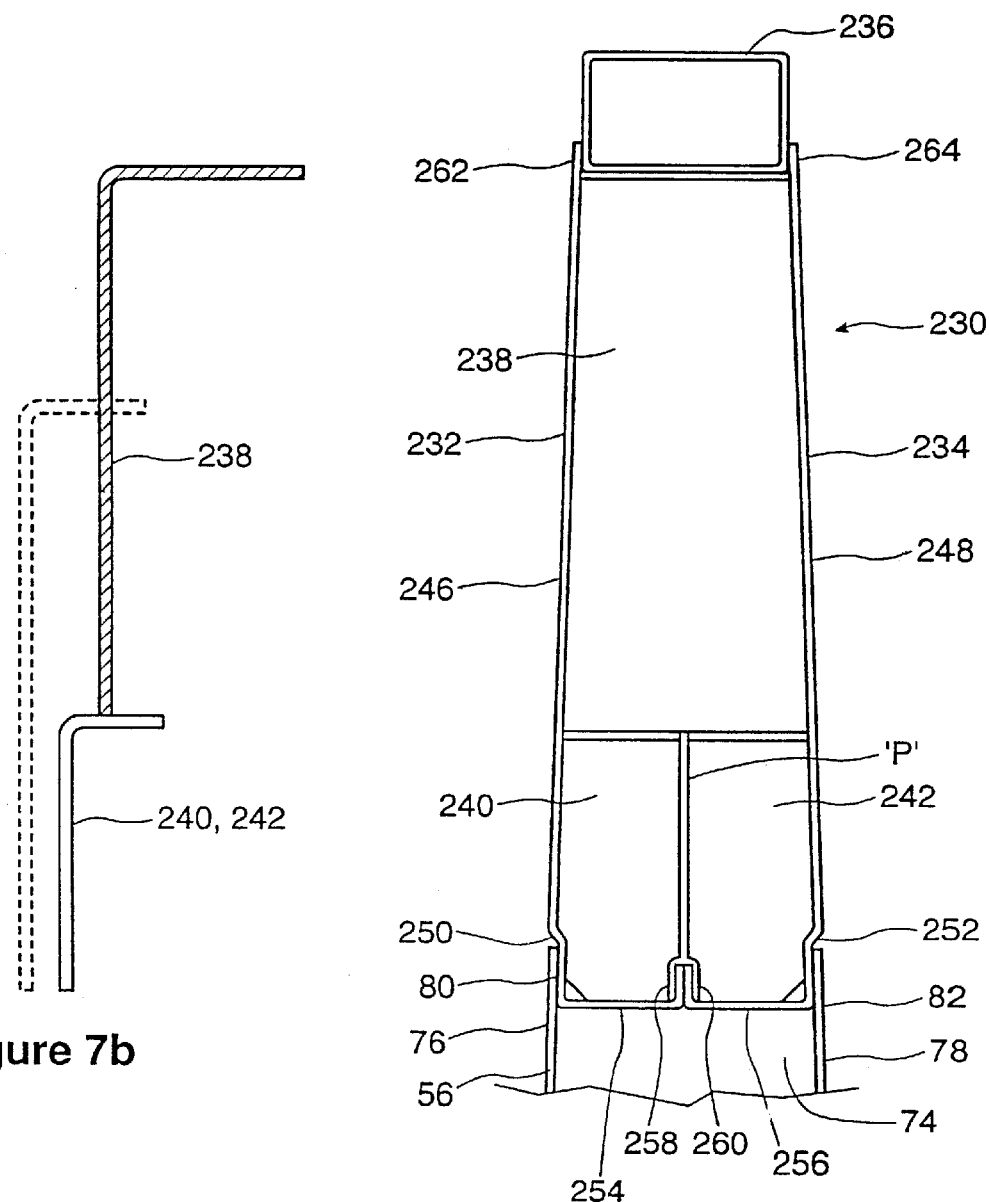

In the alternative embodiment of FIGS. 7a and 7b, a deep upper beam 230 has a pair of formed sections 232, 234, a rectangular steel tube 236, a main gusset 238 and minor gussets 240 and 242. On assembly, minor gussets 240 and 242 are welded inside the lower regions of formed section 232 and 234, being shaped to conform to the shape of the lower region of outer main sheets 246, 248, inwardly stepped shoulder 250, 252, and inwardly extending legs 254, 256. A gap 'P' is left between the respective inboard edges of gussets 240 and 242, and their outboard edges are welded to the inner face of main sheets 246, 248. Gussets 240, 242 are trimmed to be clear of re-entrant toes 258, 260. Main gusset 238 is welded upon minor gussets 240, 242, with its lateral edges welded to the inside face of main sheets 232 and 234. Tabs 262, 264 at the distal ends of main sheets 246, 248 embrace the outer side faces of steel tube 234.

Figures 8A, 8B:
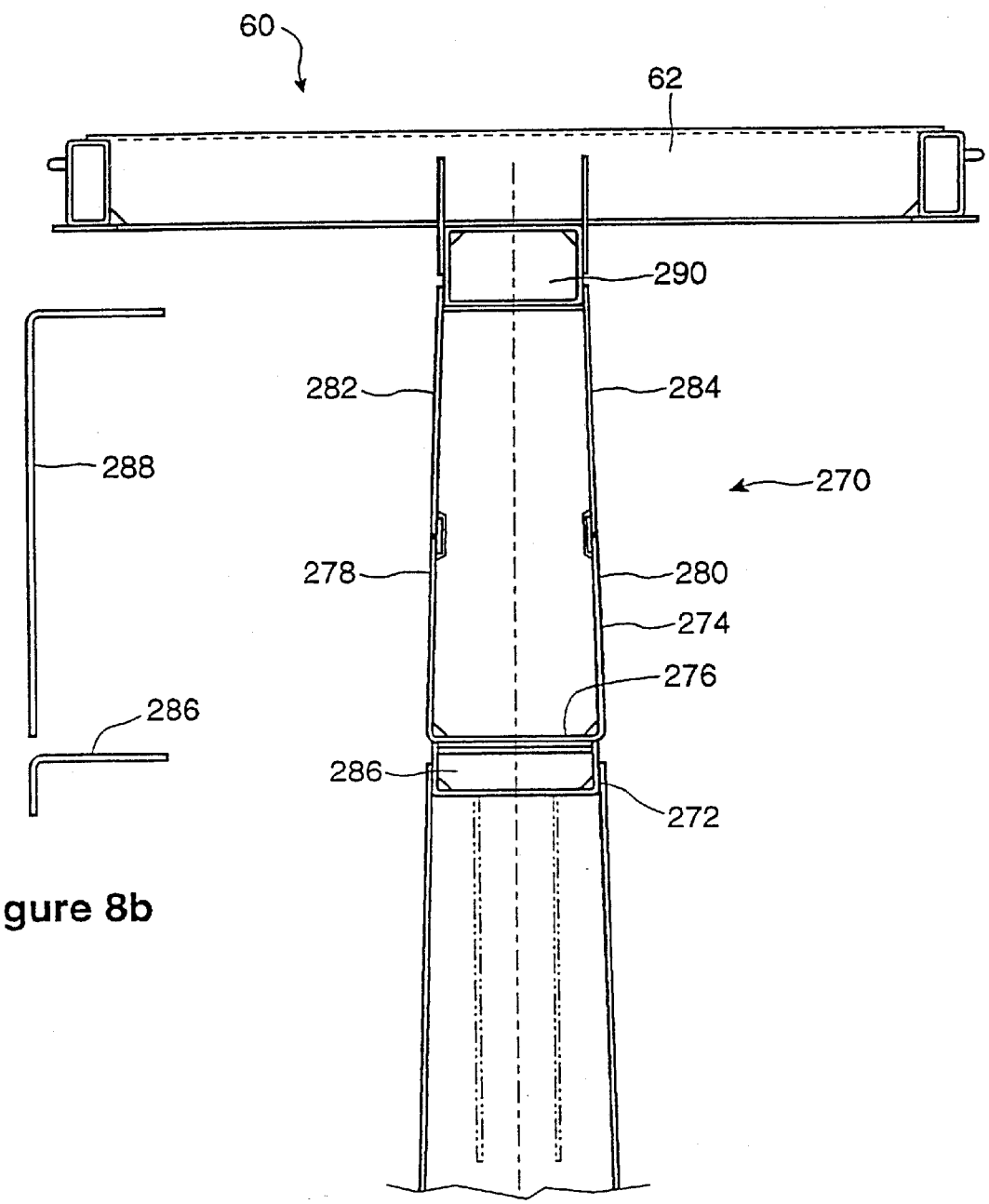

In the alternative embodiment of FIGS. 8a and 8b, a deep upper beam assembly 270 has a longitudinally extending inverted C-channel 272 upon which is welded a generally U-shaped formed section 274 having a back 276 and upwardly extending legs 278, 280 bent to lie on the slopes of the flanges of posts 56 and 57, as above. The distal ends of legs 278 and 280 abut the lower edges of a pair of skirt plates 282 and 284. A weld is formed along the abutting edges of the legs and skirts. At their furthest ends, skirt plates 282, 284 are welded to the outside faces of a 4"×6" steel tube 290. Top truss assembly 62 surmounts assembly 270. Minor gussets 286 are welded inside C-channel 272 at the longitudinal stations of posts 56 and 57, as above, and gussets 288 are welded inside legs 278, 280 and plates 282, 284 thereby providing a form to define the angular profile upon which they lie. As before, that profile is such as to yield a surface lying flush with the outer surfaces of posts 56 and 57.

The alternate embodiment of deep beam 300 of FIGS. 9a and 9b is similar to that of FIGS. 8a and 8b, but differs insofar as C-channel 272 and formed section 274 have been combined into a singular formed section 302 having inwardly stepped shoulders 304 to yield a plug shaped head 306, similar to that described in the context of FIGS. 4a. Further, rather than straight legs 278 and 280, formed section 302 has inwardly stepped toes 308 and 310, again, similar to those shown in FIG. 4a. Skirt plates 312 and 314, similar to skirt plates 282 and 284, again extend between toes 308 and 310 to terminate on the outer side faces of a rectangular steel tube 316.

In this instance a large gusset 318 is welded inside section 302, and plates 312 and 314. Gusset 318 has a vertical leg 320 having a profile cut to yield the desired slope continuity with the flanges of posts 56 and 57.

Figure 10:
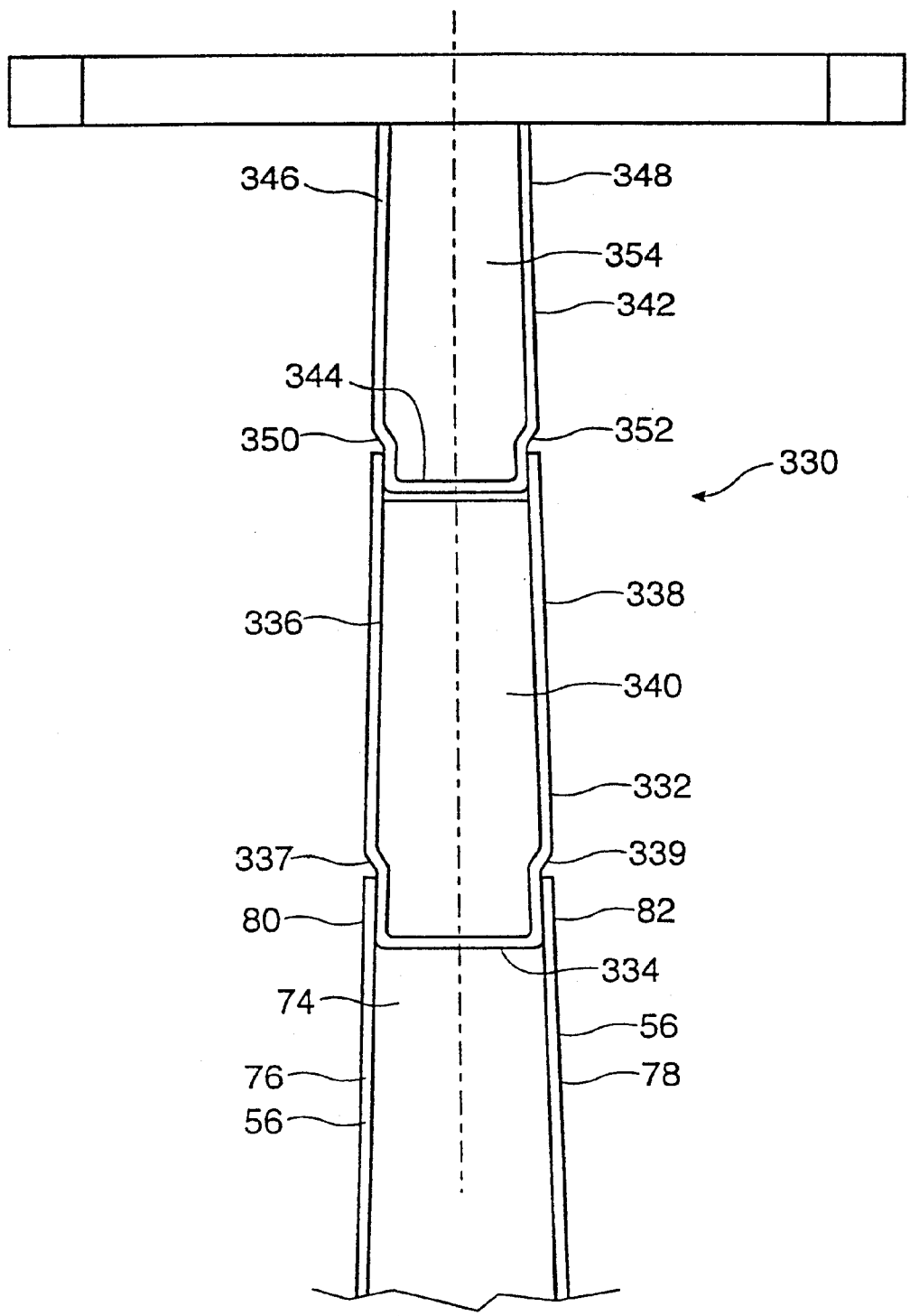

The alternate embodiment of deep beam 330 of FIG. 10 is similar to that of FIG. 8a. However, as in FIG. 9a, C-channel 272 and formed section 274 have been supplanted by a single formed section 332 having a back 334, a pair of legs 336, 338 having inwardly stepped shoulders 337, 339 and a pair of distal toes. A gusset 340 is mounted within formed section 332 at each of the longitudinal stations of car 20 corresponding to the longitudinal stations of the webs of posts 56 and 57, as described above. However, gussets 340 terminate in a horizontal leg lying shy of the tips of the distal toes of legs 336 and 338 such that another formed section 342 can seat between them. Formed section 342 has a back 344, legs 346, 348 and shoulders 350, 352. An internal stiffener in the nature of a gusset 354 is located at each of the longitudinal post stations. Back 344 provides a horizontal web sufficiently close to top truss assembly 62 that no rectangular steel tube is employed. As before, the outer faces of legs 346, 348 and legs 334, 336 are intended to lie in the same planes as the flanges of posts 56 and 57. The external faces of each of formed sections 332 and 342 each extend about a foot in depth, relative to top truss assembly 62, and present, more or less, a 2 foot wide skirt, or band, that overlaps the load limit, and the maximum loading height.

Figure 11:
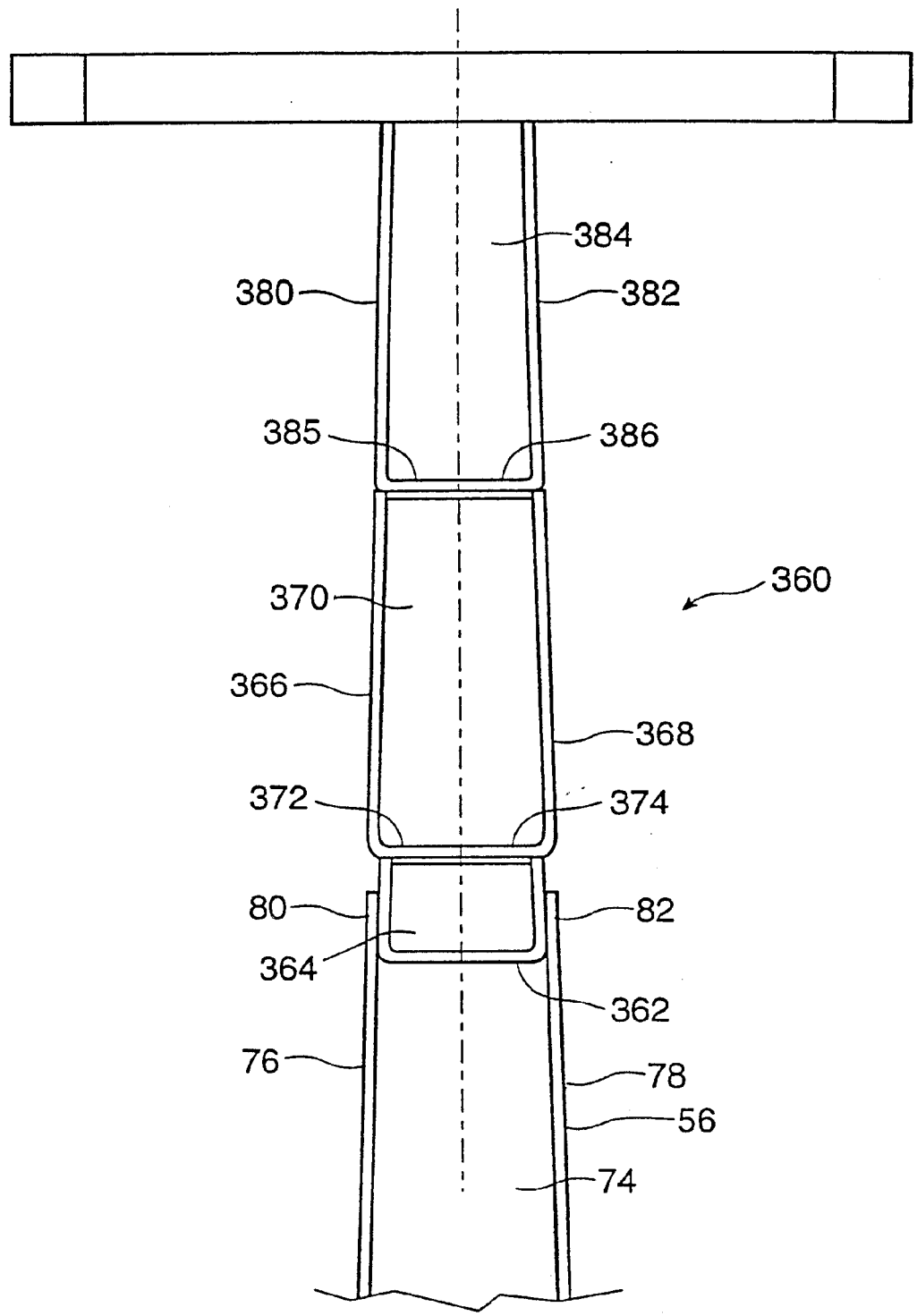

In the embodiment of FIG. 11, a deep beam assembly 360 is generally similar to deep beam assembly 330, but rather than have step-shouldered formed sections it has a C-channel 362 for mounting between tabs 80 and 82 as in FIG. 8a above, with gussets 364 mounted as described in FIG. 8a. Above this is a first pair of angle irons 366, 368, bent to present outer faces lying on the desired slope of the flanges of posts 56 and 57. Angle irons 366, 368 are welded on a series of lateral gussets 370, again, at the longitudinal stations of vertical posts 56 and 57. Angle irons 366 and 368 are also welded along the tips of their inwardly extending toes 372, 374. Another pair of angle irons 380, 382 are welded on an array of gussets 384, and along a seam at their inwardly extending toes 385, 386, and mounted above angle irons 366 and 368, as shown, such that their generally upwardly extending legs, and the consequent skirt-like surface they present, lie flush with, and on the same slopes as, the respective flanges of posts 56 and 57.

The embodiment of FIG. 12a shows a half view of a retrofit installation. (As the section is symmetrical about the centerline of the car, only one half is illustrated.) An existing center beam post is shown as 400. It has a web 402 trimmed down to leave tabs 404 and 405 which lie to either side of, and are welded to, a rectangular steel tube 406 upon which a top truss assembly 408 is mounted. A skirt panel 410 is formed with a stiffener in the nature of an inwardly bent toe 412. The length of main leg 414 is roughly 2 feet, such that its outer face overlaps both the maximum load height and the load limit height. Toe 412 is trimmed to accommodate the flanges of post 400 (analogous to posts 56 or 57). An additional reinforcement, or longitudinal stiffener, in the nature of angle 416 of a length to lie between successive posts 400, is welded to the inner face of main leg 414 at an intermediate level roughly halfway between top truss assembly 408 and toe 412. Angle 416 will tend to cause main leg 414 to resist lateral deflection between adjacent posts 400, thereby tending to assist in maintaining main leg 414 in a position to spread loads placed against it. It is preferred that panel 410 be 3/16 inches thick, but could be as thick as 1/2 or 5/8 inches. Although panel 410 is preferably a metal sheet welded to posts 400, a different fastening means, such as rivets, bolts or the like, could be used. A smooth steel face is preferred, but other metals, such as aluminum, could be used, or a suitable, rot resistant, UV resistant polymer could be selected, either as a solid sheet or as a face coating or layer, or sheet, upon a metal substrate. It is preferred that the material chosen be a non-consumable material, that is, one that may tend not to be prone to require frequent replacement such as may be required if softwood lumber battens are used, and also one that has little or no tendency to develop wood rot or to support the growth of molds.

Panel 410 need not be integrally formed with bent toe 412, but could be fabricated by using a flat sheet 420 as the external face plate, with an angle iron 422, or similar stiffener, welded along the inward facing bottom edge of the face plate between pairs of posts 400, as indicated in the other half view shown in FIG. 12b.

FIG. 12c is again a half section, showing a hollow cell panel 424 in place of panel 410. Hollow cell panel 424 has an external skin 426, an internal skin 428, and an intermediate hollow cell core 427 for carrying shear between skins 426 and 428. The hollow cells usually have a hexagonal columnar shape, the columns running perpendicular to the skins. The thickness of hollow cell panel 424 has been exaggerated for the purposes of illustration. Although skins 426 and 428 may be made of steel, they may also be made of other substances, such as structural polymers, reinforced polymers, aluminum, or other suitable material.

Figure 12C:
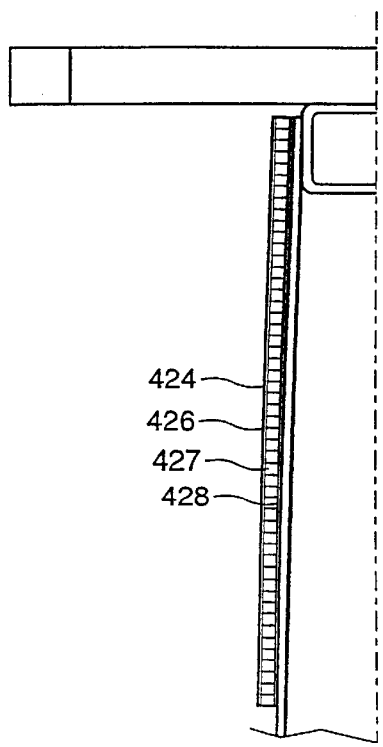
Figure 12E:
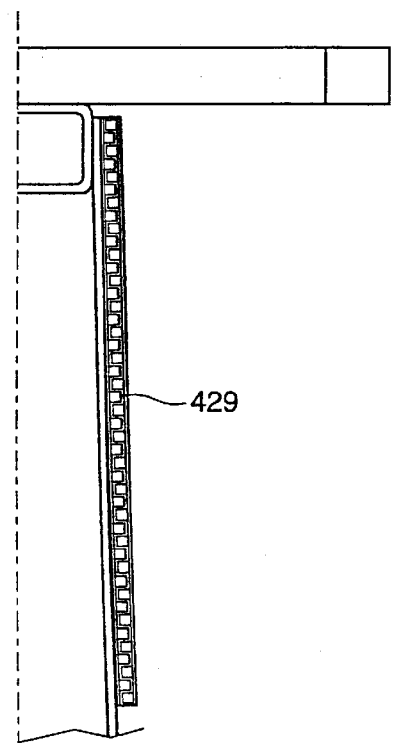
FIG. 12e shows an alternate detail to that of FIG. 12c.
Figure 12D:
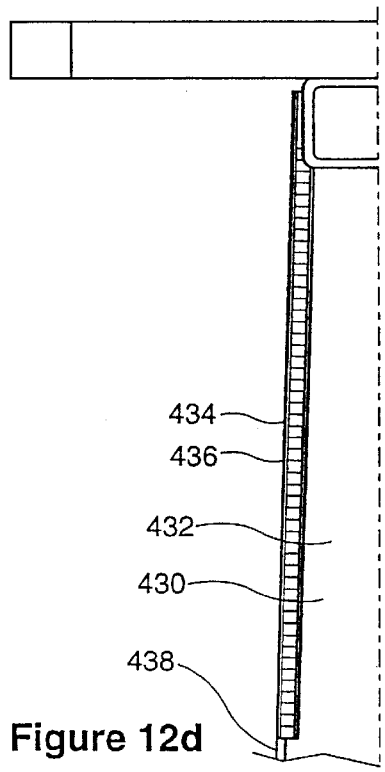

FIG. 12d is similar to FIG. 12c, but web 430 of post 432 has been trimmed back to permit outwardly facing external face 434 of hollow cell panel 436 to lie flush with flange 438 of post 432. Hollow cell panel 436 is similar in construction to hollow cell panel 424, having a pair of skins and a hollow core.

Figure 12F:
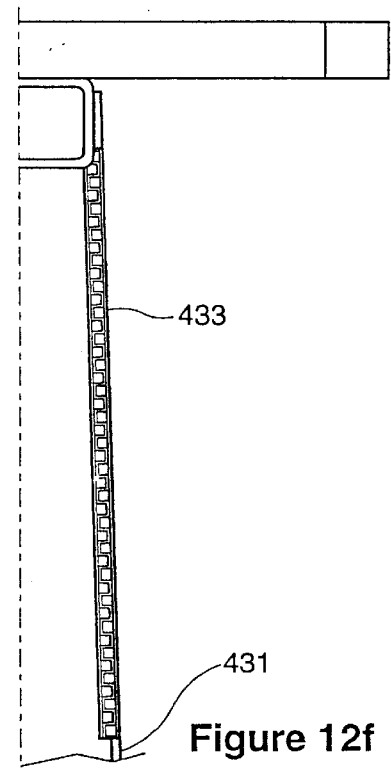
FIG. 12f shows an alternate detail to that of FIG. 12d.

FIGS. 12e and 12f correspond to FIGS. 12c and 12d respectively, and illustrate the use of a corrugated core sandwich, either standing proud of the flange of the post, as illustrated by sandwich 429 in FIG. 12e, or flush with a trimmed down flange 431 as shown by sandwich 433 in FIG. 12f. The corrugated sandwiches have inner and outer metal skins, with a reverse folded, corrugated core maintaining the skins in a spaced apart, parallel planar relationship.

In each of the embodiments illustrated in FIGS. 12a, 12b, 12c, 12d, 12e and 12f the vertical extent of the skirt can be chosen according to the lading customarily carried by the car. As noted above, in general the skirt overlaps the nominal loading height, and extends a modest distance below the nominal loading height, whether 6 inches, 12 inches, 18 inches, 24 inches, 30 inches, or 36 inches. The skirt may also tend to overlap the maximum load limit height, and, further still, to be joined at a welded lap joint to the top chord, or top chord assembly.

Figure 13:
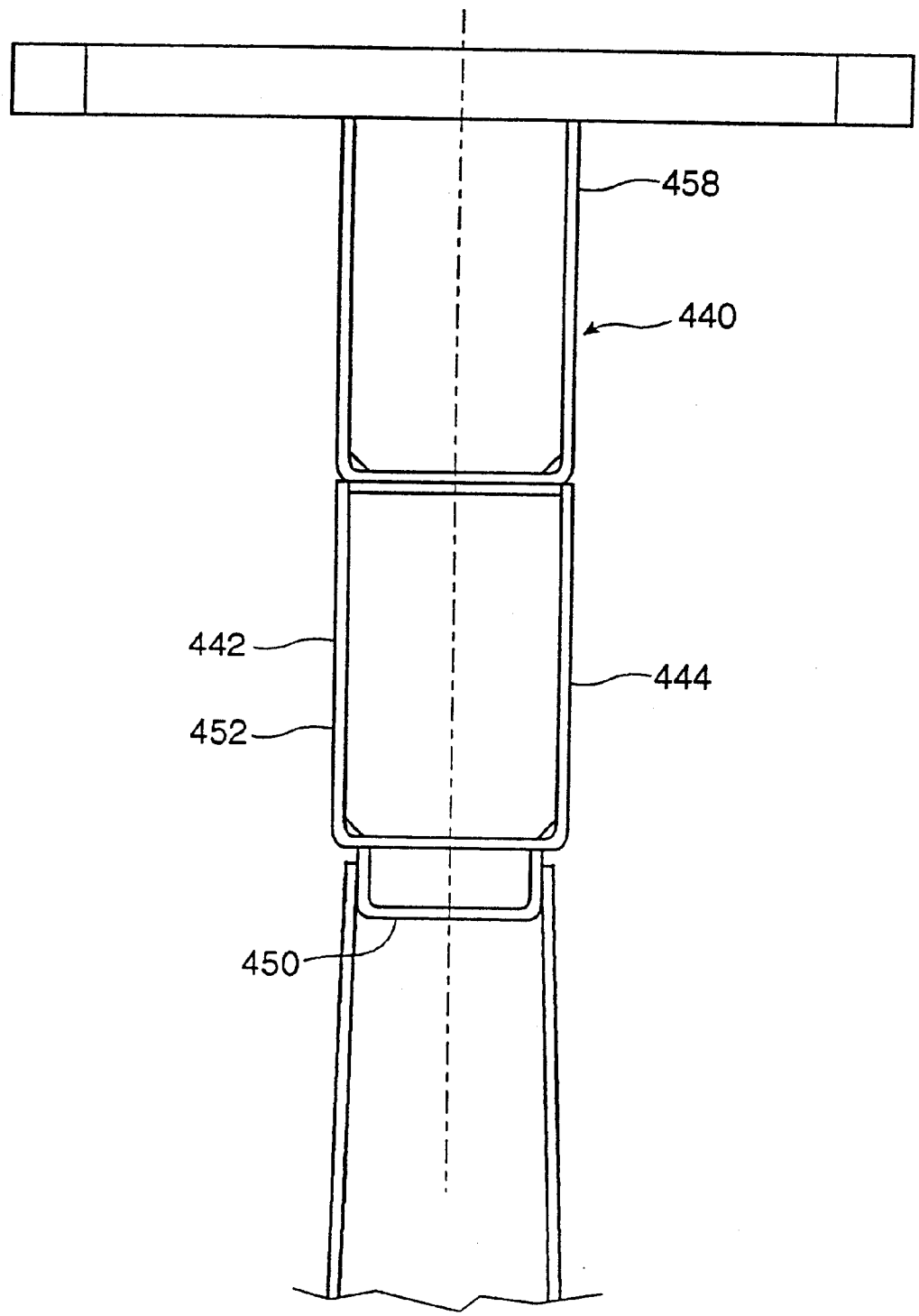

The embodiment of FIG. 13 shows a deep beam assembly 440 that is similar to deep beam assembly 360 of FIG. 11 but does not have slope continuity with the flanges of posts 56 and 57. Rather, the sides 442 and 444 of deep beam assembly 440 are parallel, and rise generally vertically.

Figure 14:
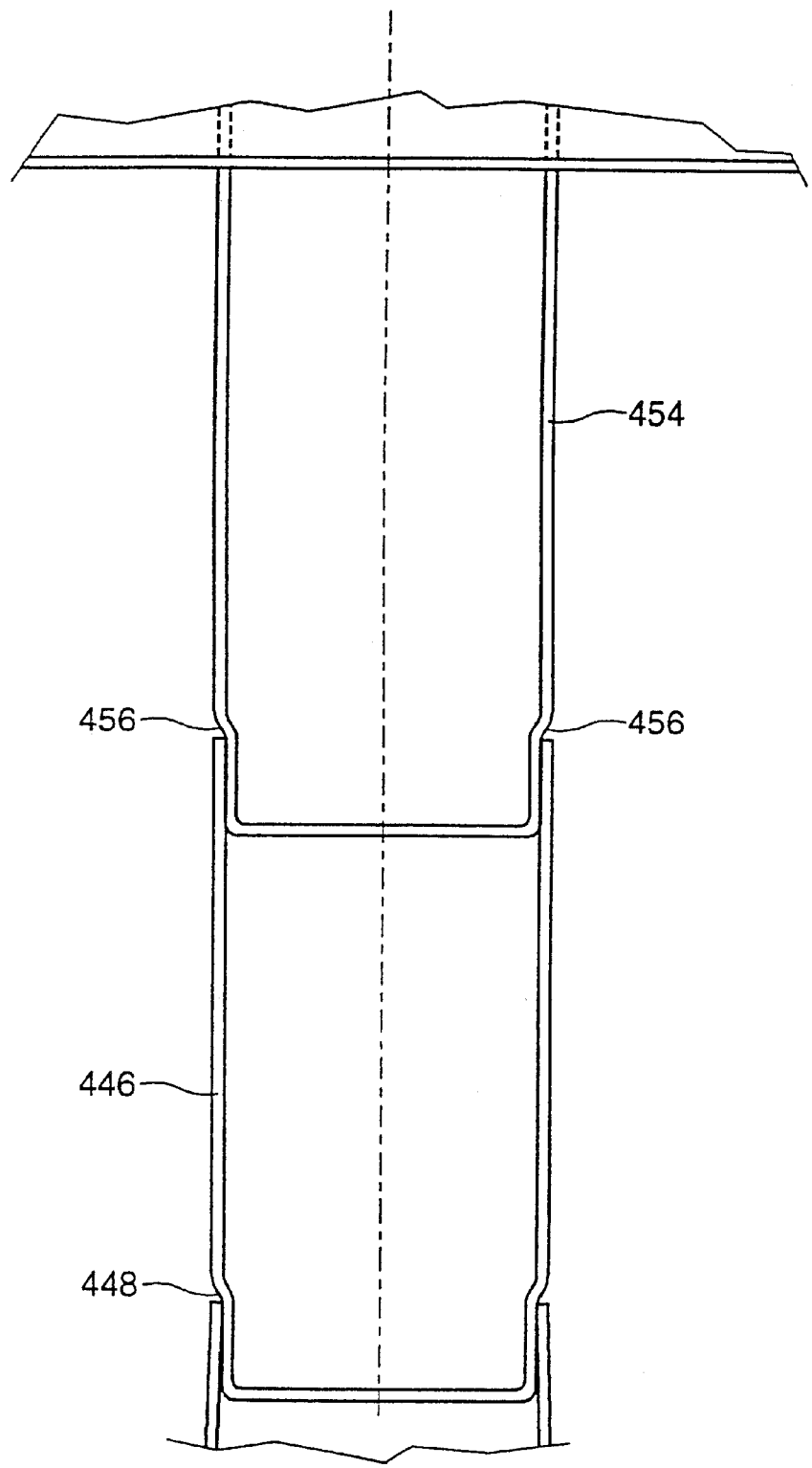

The embodiment of FIG. 14 is similar to the embodiment of FIG. 13, except insofar as it has a single formed section 446 with shoulders 448 in lieu of a C-channel 450 and section 452. Similarly, its upper formed section 454 also has shoulders 456, in contrast to upper section 458 of assembly 440.

Figure 15:
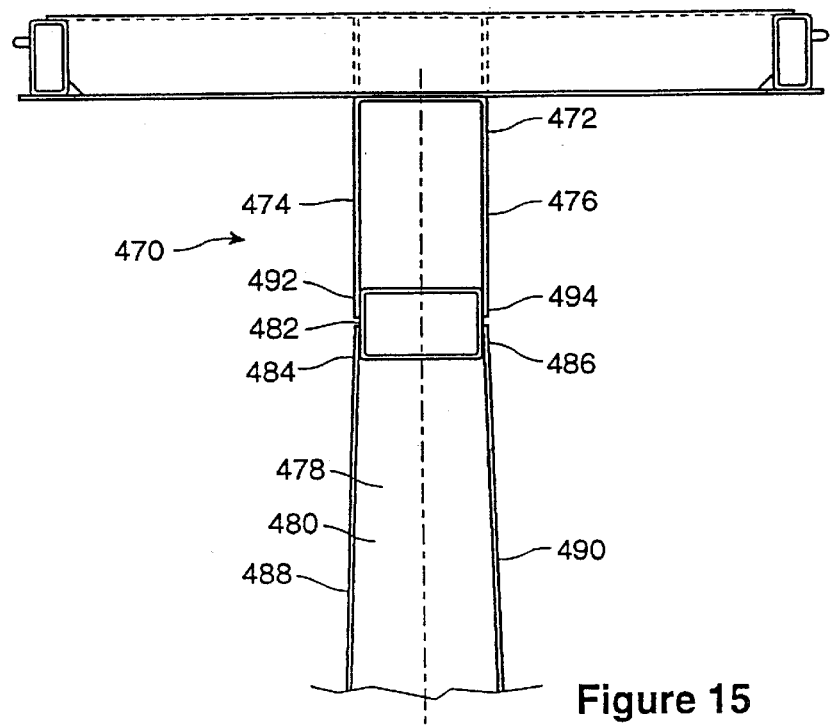
Figure 16:
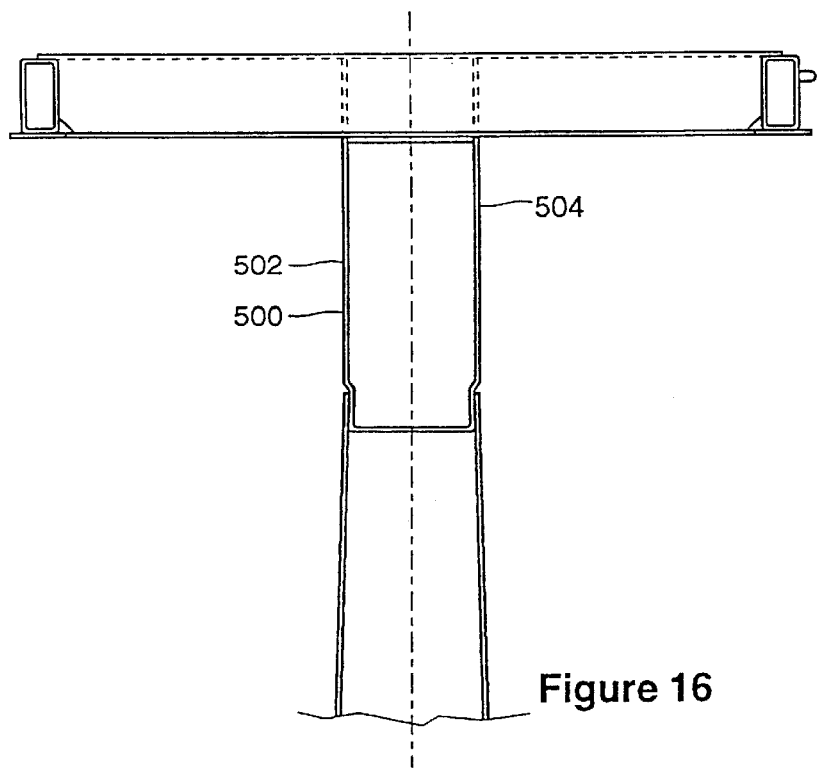

In the embodiment of FIG. 15 deep beam assembly 470 has an inverted U-shaped formed section 472 having parallel legs 474, 476. A notch has been cut in web 478 of post 480 such that a longitudinally extending rectangular steel tube 482 can seat between tabs 484 and 486 of flanges 488 and 490. The distal tips 492 and 494 of legs 474 and 476 are welded along the side faces of tube 482. In the embodiment of FIG. 16 a formed section 500 is used in place of rectangular steel tube 482. In the cases of both FIG. 15 and FIG. 16, the overall depth of the side skirts defined by legs 474, 476 or 502, 504, is roughly half that of the embodiments of FIGS. 4a, 5a, 6a, 7a, and 8a, being roughly 1 foot. This width overlaps both the load limit height and the maximum load height.

In the preferred embodiment of FIGS. 2, 3a, 3b, 4a and 4b, legs 76 and 78 extend from a root at the join to top truss 64 to a level below the upper load limit. Although other cargoes can be carried, the 132 and 1/2 inch load limit corresponds to a stack of 4 bundles of sawn lumber, each bundle being 32 inches thick and 49 inches wide for a total of 128 inches, with 1 and 1/2 inch thick dunnage between the bundles, for an additional 4 and 1/2 inches, legs 76 and 78 are roughly 24 inches long so that the bottom edge of legs 76 and 78 will extend down half the height of the top bundle to act as a skirt against which a larger bearing area of the bundle can bear, as compared to the width of the flanges of posts 56 by themselves. The skirt has a mid level reinforcement between its upper and lower extremities, namely web stiffener 84 to discourage lateral deflection of the skirt, or bowing inward.

In alternative embodiments, the level of the bottom edge of the legs could be as little as one board (1 and 1/2 inches, kiln dried wood) below the top edge of the design bundle height, but is expected to be most commonly 12 inches, 24 inches (as in the preferred embodiment) or 30 inches deep when measured from the join to the top truss.

It is possible to manufacture a generally similar center beam car to fall within the loading profile defined by AAR plate 'F', or some other height. In that case, the desired load limit height is the height that is the largest integer multiple of 33 that is less than the clearance opening. The minimum height of the bottom edge of the leg, or skirt, is desirably 1 and 1/2 inches or more below the nominal load height, typically such that the overall height of the skirt is, nominally, an integer multiple of 6 that is at least 12 inches.

Preferably, the skirt extends to a height that is at least half way down the top bundle of the nominal design load, and possibly to a height that is the full depth of the top bundle.

Although the main deck could be a continuous decking structure, this need not necessarily be so. The main deck, or lower beam structure could be in the form of an open truss, or grid work. Car 20, is preferably a car of all-steel construction. However, although the web work assembly of the center beam, and the top truss section is preferably a welded steel fabricated structure, it could be made of aluminum.

Various embodiments of the invention have now been described in detail. Since changes in and or additions to the above-described best mode may be made without departing from the nature, spirit or scope of the invention, the invention is not to be limited to those details, but only by the appended claims.

I claim:

1. A center beam rail road car having a longitudinal centerline, the rail road car being supported by rail car trucks at either end thereof, said railroad car comprising:

a cargo support structure borne between the trucks, upon which cargo can be carried;

said cargo support structure including decking having a first end, a second end, and upstanding bulkheads mounted at each of said first and second ends;

each of said bulkheads having a base adjoining said decking and an upper end upwardly distant therefrom;

a web work assembly including an array of posts mounted along the longitudinal centerline of the rail road car, said array extending upwardly of said cargo support structure;

said web work assembly having a lower region adjacent to said cargo support structure, and an upper region distant from said cargo support structure;

an upper beam located above said web work assembly, said upper beam running between said upper ends of said bulkheads;

said upper beam having at least one structural member mounted to said upper region of said web work assembly, said structural member having a longitudinally extending face against which lading placed laterally outward of said posts can bear; and a reinforcement member extending laterally inward of said face to discourage lateral deflection of said longitudinally extending face.

2. The railroad car of claim 1 wherein said longitudinally extending structural member and said reinforcement member are portions of a longitudinally extending, formed structural section.

3. The center beam car of claim 1 wherein said car has a load limit height lying at a distance measured upwardly of said cargo support structure, and said face extends from a first height that is at least as high as said load limit height to a second height that is lower than said load limit height.

4. The center beam car of claim 3 wherein the distance between said first and second heights is at least 12 inches.

5. The center beam car of claim 3 wherein the distance between said first and second heights is at least 24 inches.

6. The center beam car of claim 3 wherein the distance between said first and second heights is at least 30 inches.

7. The center beam car of claim 1 wherein said face extends between two posts of said array.

8. The center beam car of claim 1 wherein:

said face extends longitudinally past at least one of said posts;

said face has a portion that is longitudinally distant from said one of said posts; and said reinforcement stiffens said longitudinally distant portion.

9. The center beam car of claim 1 wherein said center beam car has a pair of said faces, one of said faces being located to engage loads placed laterally to one side of said web work assembly, and the other of said faces being located to engage loads placed laterally to the other side of said web work assembly.

10. The center beam assembly of claim 9 wherein said reinforcement is a web extending between said pair of faces.

11. A center beam rail road car having a longitudinal centerline, the center beam rail road car being supported by rail car trucks at either end thereof, said center beam rail road car comprising:

a center sill extending between said trucks;

a decking structure extending laterally of said center sill, upon which loads can be placed;

an open web work structure extending upwardly from said center sill;

an upper beam mounted upon said open web work structure, said upper beam being mounted to said open web work structure at a joining interface;

said upper beam having a pair of longitudinally extending, laterally spaced apart, planar members, said planar members each having a smooth outwardly facing surface against which cargo placed laterally outboard thereof can bear; and said upper beam planar members having an outside lateral dimension matching said open web work structure at said joining interface.

12. The center beam rail road car of claim 11 wherein said upper beam and said open web work structure have slope continuity at said joining interface.

13. The center beam rail road car of claim 12 wherein said open web work structure has a taper from bottom to top and said planar members are angled to match the taper of said web work structure.

14. The center beam rail road car of claim 11 wherein:

said open web work structure includes an array of upright posts spaced along said longitudinal centerline;

said posts have notched upper ends; and said upper beam has a longitudinally extending chord member formed to seat in said notched upper ends of said posts.

15. The center beam railroad car of claim 14 wherein said chord member includes a U-shaped pressing, said planar members being formed integrally therewith.

16. The center beam rail road car of claim 15 when said U-shaped pressing has a back and said planar members have an inwardly stepped shoulder extending therealong for seating in said notches of said posts.

17. The center beam rail road car of claim 14 wherein said longitudinally extending chord member is a channel having a back and legs, said back being of a width to seat in said notches of said posts, and said planar members being mounted to said legs.

18. The center beam rail road car of claim 14 wherein said longitudinally extending top chord member is a tube, and said planar members are side portions of said tube.

19. The center beam railroad car of claim 11 wherein:

said web work structure includes a plurality of upright posts spaced along the longitudinal centerline of said railroad car and diagonal bracing mounted thereto;

each of said posts has a tapering width transverse to said longitudinal centerline of said rail road car, said posts tapering from a wider position adjacent to said decking structure to narrower portion at a top end adjacent to said upper beam;

each of said posts has a notch defined in said top end thereof;

said upper beam has
- a first U-shaped formed member seated in said notch, said first U-shaped member having a back and upstanding legs;
- a second U-shaped, formed member having a back and downwardly extending legs;
- said legs of said first and second U-shaped members co-operate to define said planar members; and
- said legs of said first and second U-shaped members are formed at an angle matching the taper of said posts.

20. The center beam rail road car of claim 11 wherein:
said posts have notched upper ends; and
said upper beam assembly has a longitudinally extending chord member formed to seat in said notched upper ends of said posts.

21. The railroad car of claim 11 wherein said planar members are each formed of a hollow cell material.

22. The railroad car of claim 11 wherein said planar members are each formed of a corrugated section with an outer skin, said outer skin defining said smooth, outwardly facing surface.

23. The railroad car of claim 11 wherein said planar members are laterally inwardly reinforced to discourage bowing thereof.

24. The railroad car of claim 11 wherein said upper beam includes a longitudinally extending tube.

25. A center beam car having a longitudinal centerline, the center beam car being supported by rail car trucks at either end thereof, said center beam rail car comprising:
- a center sill extending between said trucks;
- a decking structure extending laterally of said center sill upon which loads can be placed;
- an open truss structure extending upwardly from said center sill;
- said open truss structure including an upper beam assembly mounted upwardly of, and parallel to, said center sill;
- said open truss structure including an array of posts extending between said center sill and said upper beam assembly;
- said upper beam assembly having a pair of longitudinally extending, laterally spaced apart, planar members, said planar members each having an outwardly facing surface against which cargo placed laterally outboard thereof can bear, said outwardly facing surfaces standing proud of said posts; and
- said planar members each having a longitudinally extending reinforcement mounted laterally inboard thereof to discourage lateral deflection of said faces when cargo placed laterally outward thereof bears there against.

26. The center beam railroad car of claim 25 wherein said longitudinally extending structural member and said reinforcement member are portions of a longitudinally extending, formed structural section.

27. The center beam car of claim 25 wherein said car has a load limit height lying at a distance measured upwardly of said cargo support structure, and said face extends from a first height that is at least as high as said load limit height to, a second height that is lower than said load limit height.

28. The center beam car of claim 27 wherein the distance between said first and second heights is at least 24 inches.

29. The center beam car of claim 27 wherein the distance between said first and second heights is at least 12 inches.

30. The center beam car of claim 27 wherein the distance between said first and second heights is at least 30 inches.

31. The center beam car of claim 25 wherein said center beam car has a pair of said surfaces, one of said outwardly facing surfaces is located to engage lading placed laterally to one side of said posts, and the other of said outwardly facing surfaces is located to engage lading placed laterally to the other side of said posts. between said surfaces.

32. The center beam car of claim 31 wherein said reinforcement is a web extending.

33. The center beam railroad car of claim 25 wherein said posts have outwardly facing flanges, and said flanges and said surfaces lie in parallel planes.

34. The center beam rail road car of claim 25 wherein said posts have a taper from bottom to top and said surfaces are angled to match the taper of said posts.

35. The center beam railroad car of claim 25 wherein said upper beam assembly includes a U-shaped pressing, said surfaces being formed integrally therewith.

36. The center beam rail road car of claim 35 wherein said U-shaped pressing has a back and an inwardly stepped shoulder for seating in said notches of said posts.

37. The center beam rail road car of claim 25 wherein said upper beam assembly includes a channel having a back and legs, said back being of a width to seat in said notches of said posts, and said legs defining said surfaces.

38. The center beam rail road car of claim 25 wherein said upper beam assembly includes a longitudinally extending top chord member, said top chord member is a tube, said tube has side portions, and said surfaces are defined by said side portions of said tube.

39. The railroad car of claim 25 wherein said posts have a laterally outwardly facing flange, and said surface stands proud thereof a distance less than ¾ inches.

40. The railroad car of claim 25 wherein said planar members are each formed of a hollow cell material having an outwardly facing skin.

41. The railroad car of claim 25 wherein said upper beam assembly includes a tube, said laterally spaced apart planar members being sides of said tube.

42. A rail road car having a longitudinal centerline, comprising:
- a pair of rail car trucks and a center beam assembly carried thereupon;
- said center beam assembly having a center sill;
- a cargo support structure extending laterally of said center sill assembly; and
- a plurality of posts extending upwardly from said center sill, said cargo support structure including decking having a first end, a second end, and upstanding bulkheads mounted at each of said first and second ends;
- each of said bulkheads having a base adjoining said decking and an upper end upwardly distant therefrom;
- said posts having a lower region adjacent said center sill and an upper region distant from said center sill;
- a non-consumable, longitudinally extending upper beam assembly mounted to said upper region of said posts and running between said upper ends of said bulkheads, said upper beam assembly including a longitudinally extending structural member presenting a bearing surface facing laterally outward, against which cargo can bear, said bearing surface being reinforced to discourage lateral deflection thereof.

43. The railroad car of claim 42 wherein said posts have a laterally outwardly facing flange and said laterally outwardly facing bearing surface is mounted flush with said flange.

44. The railroad car of claim 42 wherein said posts have a laterally outwardly facing flange, and said bearing surface stands proud thereof a distance less than ¾ inches.

45. The rail road car of claim 42 wherein said longitudinally reinforced structural member is formed of a hollow cell material having an outwardly facing skin.

46. The rail road car of claim 42 wherein said longitudinally reinforced structural member is formed of a corrugated section with an outer skin against which objects may bear.

47. The rail road car of claim 42 wherein said longitudinally reinforced structural member is laterally inwardly reinforced to discourage bowing thereof between adjacent pairs of said posts.

48. The rail road car of claim 42 wherein said longitudinally reinforced structural member is a tube.

49. The rail road car of claim 42 wherein said posts have a laterally outwardly facing flange, and said bearing surface stands proud thereof.

50. The railroad car of claim 42 wherein said planar members are each formed of a corrugated section with an outer skin against which objects may bear.

* * * * *